(12) United States Patent
Zhang et al.

(10) Patent No.: US 11,509,939 B2
(45) Date of Patent: Nov. 22, 2022

(54) POINT CLOUD ENCODING AND DECODING METHOD, ENCODER, AND DECODER

(71) Applicant: GUANGDONG OPPO MOBILE TELECOMMUNICATIONS CORP., LTD., Guangdong (CN)

(72) Inventors: Wei Zhang, Dongguan (CN); Junyan Huo, Dongguan (CN); Yanzhuo Ma, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/646,290

(22) Filed: Dec. 28, 2021

(65) Prior Publication Data
US 2022/0124374 A1    Apr. 21, 2022

Related U.S. Application Data

(63) Continuation of application No. PCT/CN2020/090677, filed on May 15, 2020.
(Continued)

(51) Int. Cl.
*H04N 19/70* (2014.01)
*H04N 19/119* (2014.01)
(Continued)

(52) U.S. Cl.
CPC ........... *H04N 19/70* (2014.11); *H04N 19/119* (2014.11); *H04N 19/174* (2014.11); *H04N 19/30* (2014.11); *H04N 19/96* (2014.11); *H04N 19/60* (2014.11)

(58) Field of Classification Search
None
See application file for complete search history.

(56) References Cited

U.S. PATENT DOCUMENTS

2022/0036595 A1* 2/2022 Sugio .................. H04N 19/184

FOREIGN PATENT DOCUMENTS

| CN | 108833927 A | 11/2018 |
|----|-------------|---------|
| CN | 109196559 A | 1/2019  |

(Continued)

OTHER PUBLICATIONS

International search report issued in corresponding international application No. PCT/CN2020/090677 dated Aug. 18, 2020.
(Continued)

*Primary Examiner* — Christopher Braniff
(74) *Attorney, Agent, or Firm* — Perkins Coie LLP

(57) ABSTRACT

A point cloud encoding and decoding method, an encoder, and a decoder are provided. The encoder determines a processing order of point cloud data during point cloud encoding. The encoder determines a coordinate-axis-order index corresponding to the processing order. The encoder encodes the coordinate-axis-order index and signals encoded bits into a bitstream. The encoder processes the point cloud data according to the processing order, to obtain point cloud data to-be-encoded. The encoder encodes the point cloud data to-be-encoded and signals encoded bits into the bitstream. The decoder parses a bitstream to obtain a coordinate-axis-order index, determines a processing order of point cloud data during point cloud decoding according to the coordinate-axis-order index, parses the bitstream to obtain recovered data of the point cloud data, and determines a position of coordinate data of the point cloud data in a storage unit of the recovered data according to the processing order.

20 Claims, 14 Drawing Sheets

Related U.S. Application Data

(60) Provisional application No. 62/870,553, filed on Jul. 3, 2019.

(51) Int. Cl.
  *H04N 19/174* (2014.01)
  *H04N 19/30* (2014.01)
  *H04N 19/96* (2014.01)
  *H04N 19/60* (2014.01)

(56) References Cited

FOREIGN PATENT DOCUMENTS

| | | |
|---|---|---|
| CN | 109716329 A | 5/2019 |
| EP | 3324310 A1 | 5/2018 |
| EP | 3429212 A1 | 1/2019 |
| EP | 3993424 A1 | 5/2022 |
| WO | WO2018093886 * | 5/2018 |
| WO | 2021000205 A1 | 1/2021 |

OTHER PUBLICATIONS

First examination report issued in corresponding IN application No. 202117061553 dated Jun. 30, 2022.

Wei Zhang et al.:"[G-PCC| [new proposal] The effect of RAHT transform order on the attribute coding performance", dated Jul. 3, 2019.

David Flynn (Apple) et al.:"[G-PCC] [New proposal] G-PCC geometry swizzling", dated Oct. 3, 2019.

The extended European search report issued in corresponding European application No. 20834209.7 dated Aug. 19, 2022.

\* cited by examiner

| x: | 0<br>000 | 1<br>001 | 2<br>010 | 3<br>011 | 4<br>100 | 5<br>101 | 6<br>110 | 7<br>111 |
|---|---|---|---|---|---|---|---|---|
| y: 0<br>000 | 000000 | 000001 | 000100 | 000101 | 010000 | 010001 | 010100 | 010101 |
| 1<br>001 | 000010 | 000011 | 000110 | 000111 | 010010 | 010011 | 010110 | 010111 |
| 2<br>010 | 001000 | 001001 | 001100 | 001101 | 011000 | 011001 | 011100 | 011101 |
| 3<br>011 | 001010 | 001011 | 001110 | 001111 | 011010 | 011011 | 011110 | 011111 |
| 4<br>100 | 100000 | 100001 | 100100 | 100101 | 110000 | 110001 | 110100 | 110101 |
| 5<br>101 | 100010 | 100011 | 100110 | 100111 | 110010 | 110011 | 110110 | 110111 |
| 6<br>110 | 101000 | 101001 | 101100 | 101101 | 111000 | 111001 | 111100 | 111101 |
| 7<br>111 | 101010 | 101011 | 101110 | 101111 | 111010 | 111011 | 111110 | 1111111 |

*FIG. 3*

POINT CLOUD ENCODING AND DECODING METHOD, ENCODER, AND DECODER

CROSS-REFERENCE TO RELATED APPLICATION(S)

This application is a continuation of International Application No. PCT/CN2020/090677, filed May 15, 2020, which claims priority to and the benefit of U.S. Provisional application patent Ser. No. 62/870,553, filed Jul. 3, 2019, the entire disclosures of which are hereby incorporated by reference.

TECHNICAL FIELD

This disclosure relates to the technical field of video coding, and in particularly to a point cloud encoding and decoding method, an encoder, and a decoder.

BACKGROUND

In an encoder framework of geometry-based point cloud compression (G-PCC), geometry information of the point cloud and attribute information corresponding to each point cloud are encoded separately. After encoding of the geometry information is completed, the geometry information is reconstructed. Encoding of the attribute information will depend on the reconstructed geometry information.

Currently, the encoding of the attribute information mainly aims at encoding of colour information. First, the colour information is transformed from a RGB colour space to a YUV colour space. Thereafter, use the reconstructed geometry information to recolor the point cloud, so that un-encoded attribute information can correspond to the reconstructed geometry information. During encoding of the colour information, there are mainly two transform methods. One is distance-based lifting transform which relies on level of detail (LOD) partition. The other is regional adaptive hierarchical transform (RAHT) which is performed directly. Both methods transform the colour information from a spatial domain to a frequency domain, obtain high-frequency coefficients and low-frequency coefficients through transform, finally quantize the coefficients, and encode to generate a binary bitstream.

However, in RAHT, for any point cloud, the same fixed order is used to perform RAHT, which does not fully show transform efficiency of RAHT. Thus, the transform efficiency is low, reducing coding (i.e., encoding and decoding) efficiency.

SUMMARY

In a first aspect, implementations of this application provide a point cloud encoding method. The method is implemented in an encoder and includes the following. A processing order of point cloud data during point cloud encoding is determined, where the processing order indicates a coordinate axis processing order of three-dimensional coordinates of the point cloud data and the point cloud data is all or part of data in point cloud. A coordinate-axis-order index corresponding to the processing order is determined. The coordinate-axis-order index is encoded and encoded bits are signalled into a bitstream. The point cloud data is processed according to the processing order, to obtain point cloud data to-be-encoded. The point cloud data to-be-encoded is encoded and encoded bits are signalled into the bitstream.

In a second aspect, implementations of this application provide a point cloud decoding method. The method is implemented in a decoder and includes the following. A bitstream is parsed to obtain a coordinate-axis-order index. A processing order of point cloud data during point cloud decoding is determined according to the coordinate-axis-order index, where the processing order indicates a coordinate axis processing order of three-dimensional coordinates of the point cloud data and the point cloud data is all or part of data in point cloud. The bitstream is parsed to obtain recovered data of the point cloud data. A position of coordinate data of the point cloud data in a storage unit of the recovered data is determined according to the processing order.

In a third aspect, implementations of this application provide an encoder. The encoder includes at least one processor and a memory. The memory is coupled to the at least one processor and stores at least one computer executable instruction thereon which, when executed by the at least one processor, causes the at least one processor to execute the method of the first aspect.

In a fourth aspect, implementations of this application provide a decoder. The decoder includes at least one processor and a memory. The memory is coupled to the at least one processor and stores at least one computer executable instruction thereon which, when executed by the at least one processor, causes the at least one processor to execute the method of the second aspect.

BRIEF DESCRIPTION OF THE DRAWINGS

FIG. 3 is schematic diagram 1 of spatial encoding.

DETAILED DESCRIPTION

For a more detailed understanding of features and technical contents of implementations of this application, realization of the implementations of this application will be described in detail below with reference to the accompanying drawings. The attached accompanying drawings are merely for reference and description, but are not used to limit the implementations of this application.

In the implementations of this application, in an encoder framework of geometry-based point cloud compression (G-PCC) of point cloud, after point cloud of an input three-dimensional image model is partitioned into slices, each slice is encoded independently.

Figure 1:
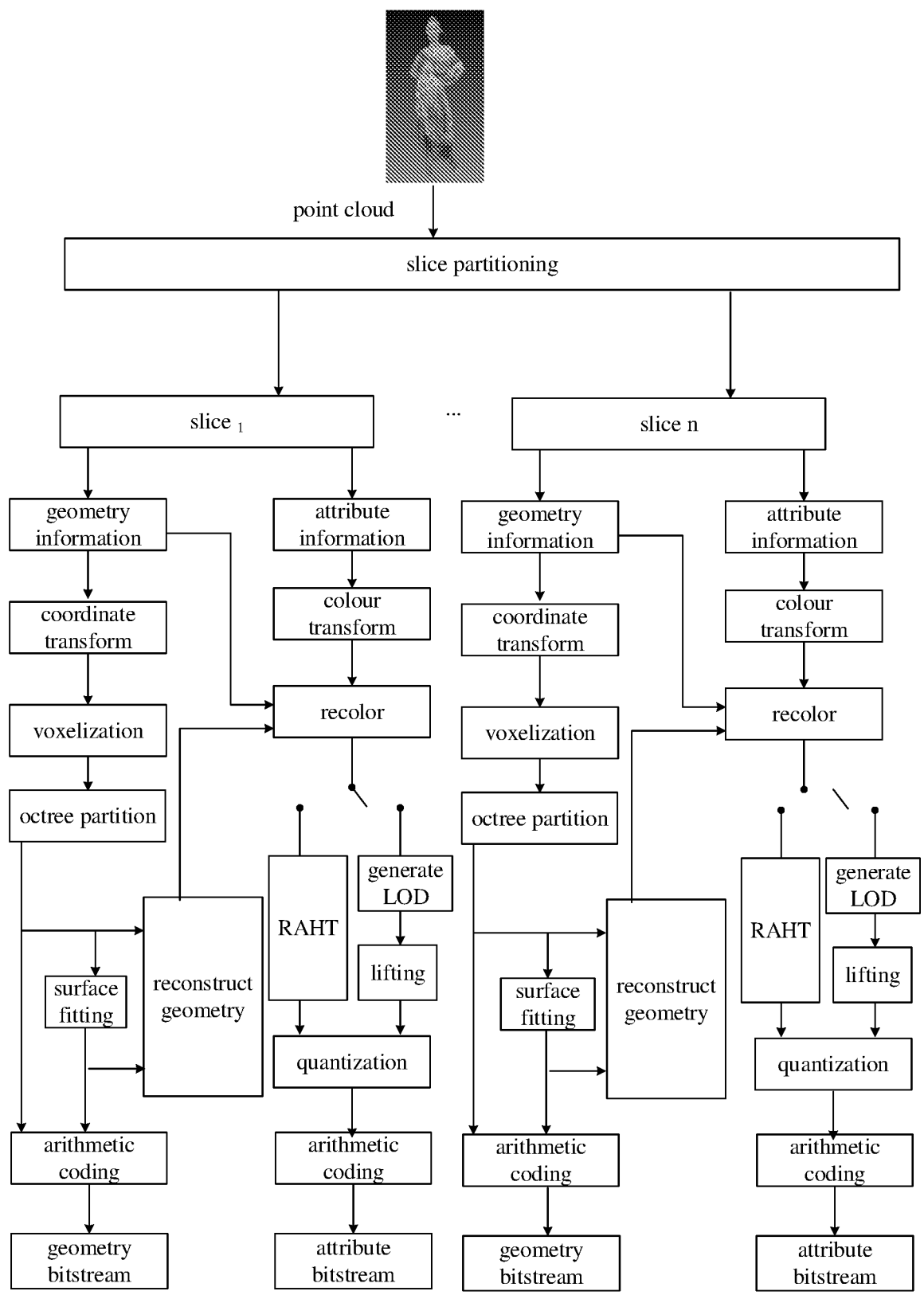
FIG. 1 is a block diagram of a process of geometry-based point cloud compression (G-PCC) encoding.

FIG. 1 is a block diagram of a process of G-PCC encoding. As illustrated in the block diagram of the process of the G-PCC encoding of FIG. 1, it is applied to a point cloud encoder. For point cloud data to-be-encoded, through slice partition, the point cloud data is first partitioned into multiple slices. In each slice, geometry information of the point cloud and attribute information corresponding to each point cloud are encoded separately. During encoding of the geometry information, perform coordinate transform on the geometry information to so that all of the point cloud is contained in a bounding box, and then quantify, which mainly plays a role of scaling. Due to the rounding of quantifying, the geometry information of part of the point cloud is the same, so decide whether to remove duplicate points based on parameters. The process of quantifying and removing the duplicate points is also called the voxelization. Thereafter, perform octree partition on the bounding box. During encoding of the geometry information based on octree, the bounding box is equally partitioned into eight sub-cubes, and non-empty (including points in the point cloud) sub-cubes are continued to be partitioned into eight equal parts until leaf nodes obtained through partition are 1×1×1 unit cubes. Perform arithmetic coding on nodes in the leaf nodes to generate a binary geometry bitstream, that is, geometry code stream. During encoding of the geometry information based on triangle soup (trisoup), octree partition is also performed first. Different from the encoding of the geometry information based on octree, the trisoup does not need to partition the point cloud step by step into unit cubes each with an edge length of 1×1×1, but partitions the point cloud into blocks each with an edge length of W and then stops the partition. Based on a surface formed by distribution of the point cloud in each block, at most twelve vertexes generated by both the surface and twelve edges of the block are obtained. Perform arithmetic coding on the vertexes (surface fitting based on vertexes), to generate a binary geometry bitstream, that is, geometry code stream. The vertexes are also used in implementation of geometry reconstruction and reconstructed geometry information is used when the attribute information of the point cloud is encoded.

During encoding of the attribute information, after the encoding of the geometry information is completed and the geometry information is reconstructed, colour transform is performed, that is, colour information (i.e., the attribute information) is transformed from a RGB colour space to a YUV colour space. Thereafter, use the reconstructed geometry information to recolor the point cloud, so that attribute information that has not been encoded can correspond to the reconstructed geometry information. The encoding of the attribute information mainly aims at encoding of the colour information. During the encoding of the colour information, there are mainly two transform methods. One is distance-based lifting transform which relies on level of detail (LOD) partition. The other is regional adaptive hierarchical transform (RAHT) which is performed directly. Both methods transform the colour information from a spatial domain to a frequency domain, obtain high-frequency coefficients and low-frequency coefficients through transform, and finally quantize the coefficients (i.e., quantized coefficients). At last, after octree partition and surface fitting, geometry encoding data and quantized coefficient processing attribute encoding data are slice-synthesized, and vertex coordinates of each block are encoded in turn (that is, arithmetic coding), to generate a binary attribute bitstream, that is, attribute code stream.

Figure 2:
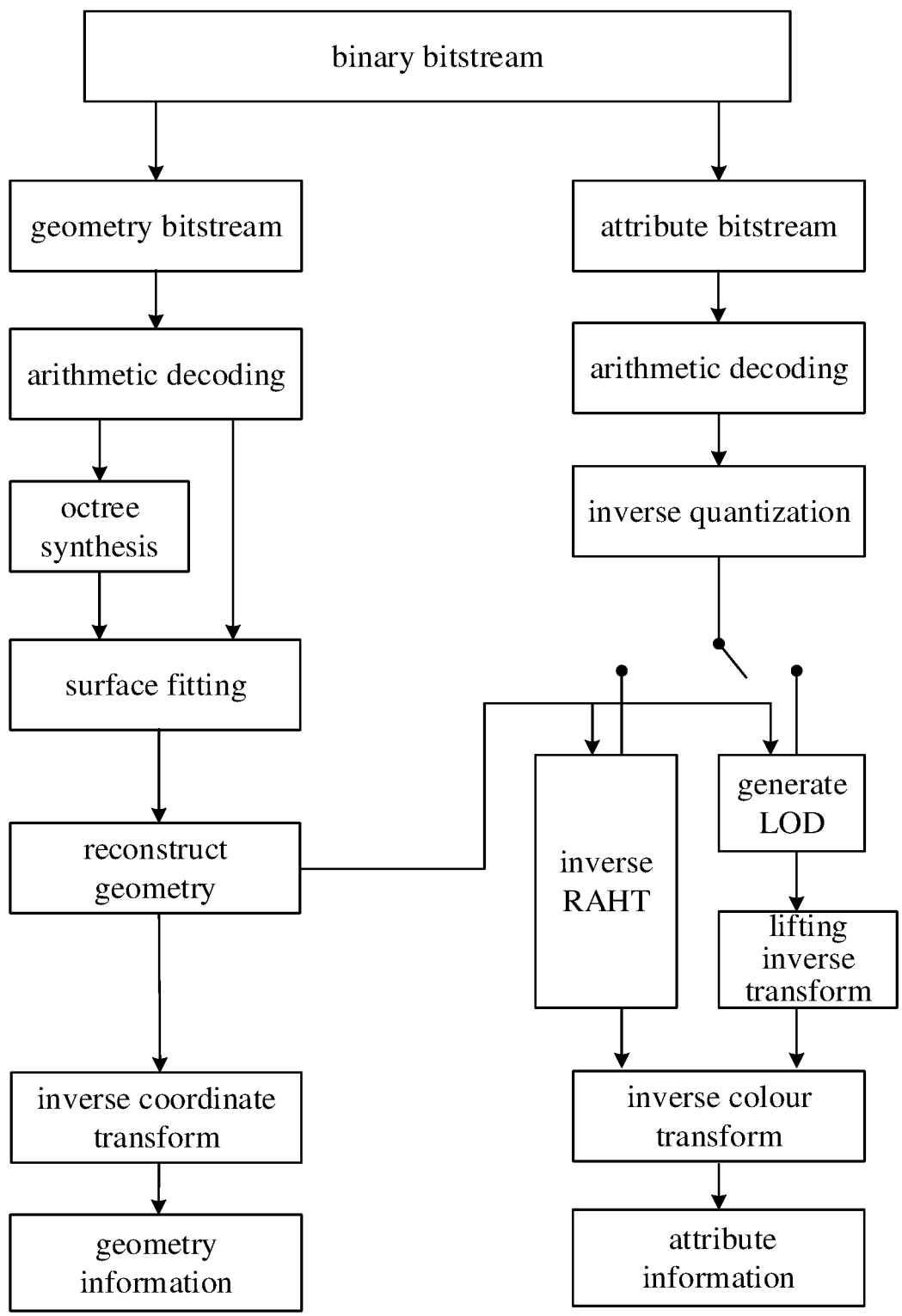
FIG. 2 is a block diagram of a process of G-PCC decoding.

FIG. 2 is a block diagram of a process of G-PCC decoding. As illustrated in the block diagram of the process of the G-PCC decoding of FIG. 2, it is applied to a point cloud decoder. For the obtained binary bitstream, first, the geometry bitstream and the attribute bitstream in the binary bitstream are decoded independently. When decoding the geometry bitstream, the geometry information of the point cloud is obtained through arithmetic decoding-octree synthesis-surface fitting—reconstructing geometry—inverse coordinate transform. When decoding the attribute bitstream, the attribute information of the point cloud is obtained through arithmetic decoding-inverse quantization-LOD-based lifting inverse transform or RAHT-based inverse transform-inverse colour transform. The three-dimensional image model of the point cloud data to-be-encoded is restored based on the geometry information and the attribute information.

As illustrated in the block diagram of the process of the G-PCC encoding of FIG. 1, RAHT is a part where the attribute information of the point cloud is encoded. It uses the Harr wavelet transform principle to perform lossy encoding, generally suitable for sparse point cloud. Specifically, before RAHT, geometric coordinate information of the point cloud has been obtained. The coordinate information of points can be used to obtain a Morton code corresponding to each point in the point cloud. The Morton code is also called z-order code, because its encoding order is in spatial z-order. Specifically, the method of calculating Morton code is described as follows. For three-dimensional coordinates with each component represented by a d-bit binary digit, the three coordinate components are represented by the following formula.

$$x = \sum_{l=1}^{d} 2^{d-l} x_l \quad (1)$$

$$y = \sum_{l=1}^{d} 2^{d-l} y_l \quad (2)$$

$$z = \sum_{l=1}^{d} 2^{d-l} z_l \quad (3)$$

$x_l, y_l, z_l \in \{0,1\}$ are respectively binary values corresponding to the highest bit (l=1) to the lowest bit (l=d) of x, y, z. The Morton code M is, for x, y, z, from the highest bit to the lowest bit, alternately sorting $x_l, y_l, z_l$. The calculation formula of M is as follows.

$$M = \sum_{l=1}^{d} 2^{3(d-l)}(4x_l + 2y_l + z_l) = \sum_{l'=1}^{3d} 2^{3d-l'} m_{l'} \quad (4)$$

$m_{l'} \in \{0,1\}$ are values from the highest bit (l'=1) to the lowest bit (l'=3d) of M. After the Morton code M of each point in the point cloud is obtained, the points in the point cloud are sorted in an ascending order according to the Morton code, and a weight w of each point is set to be 1. It is represented as a computer language, similar to a combination of z|(y<<1)|(x<<2).

Figure 4:
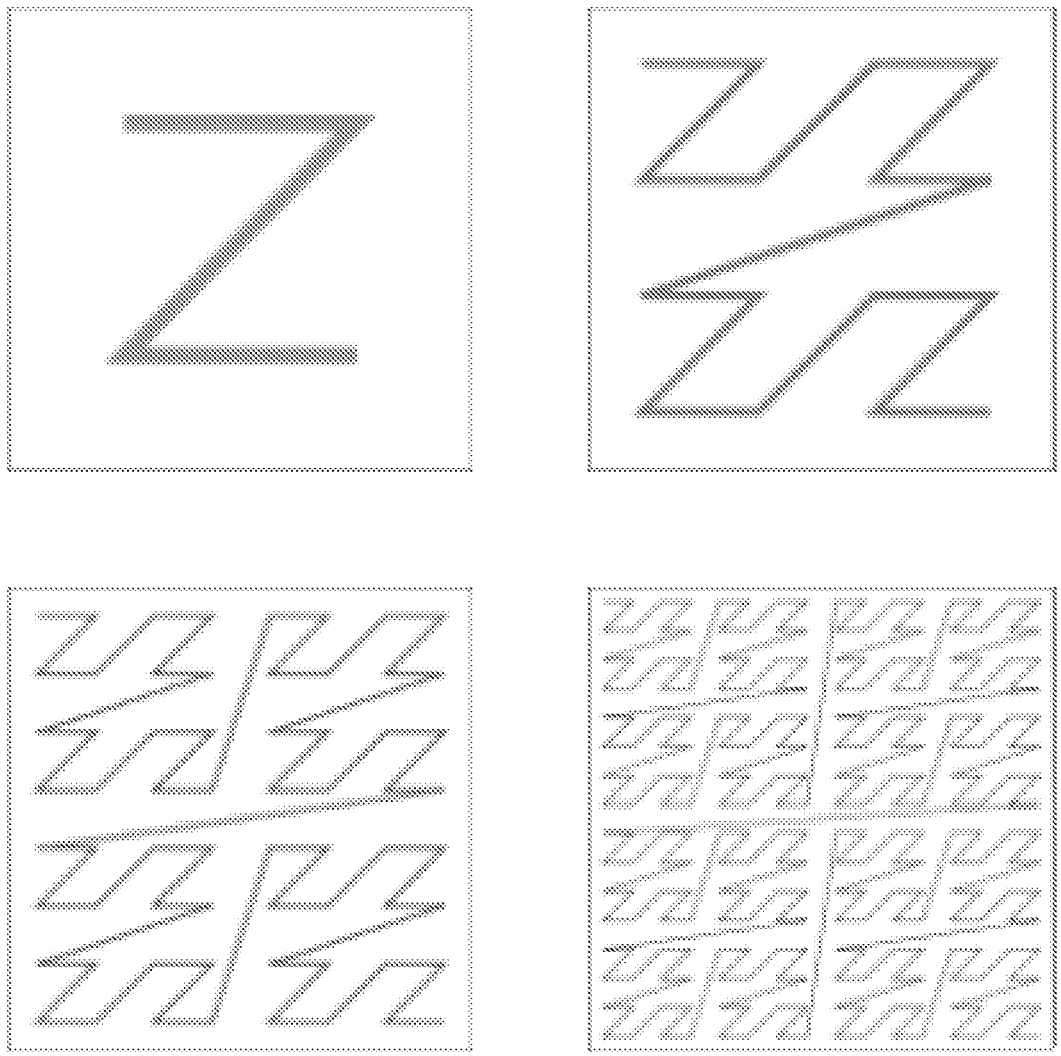
FIG. 4 is schematic diagram 2 of spatial encoding.

FIG. 3 is schematic diagram 1 of spatial encoding. FIG. 4 is schematic diagram 2 of spatial encoding. Combining FIG. 3 and FIG. 4 for description, an example where a sorting order from the high bit to the low bit is z, y, x (x|(y<<1)|(z<<2)) is described.

FIG. 3 illustrates spatial encoding of each pixel of an 8*8 image, from 000000 to 111111, using a one-dimensional binary number to encode position coordinates of values of x and y at 0-7. Interleave binary coordinate values to obtain a binary z-value map. Connect the z-shape in a numerical direction, to generate a recursive z-shaped curve. At each position in the figure, the z value is placed in the connection order. In fact, the above figure is iteratively generated in the Z direction. From 00 to 11 (one z in the entire figure), then from 0000 to 1111 (place one z at each point of the previous z), and then from 000000 to 111111 (place one z at each point of the previous z), increase two bits each time, increasing recursively.

Exemplarily, FIG. 4 illustrates 2×2, 4×4, 8×8, and 16×16 spatial encoding orders, from which it can be seen that the encoding order of the Morton code is implemented according to the spatial z-order.

Figure 5:
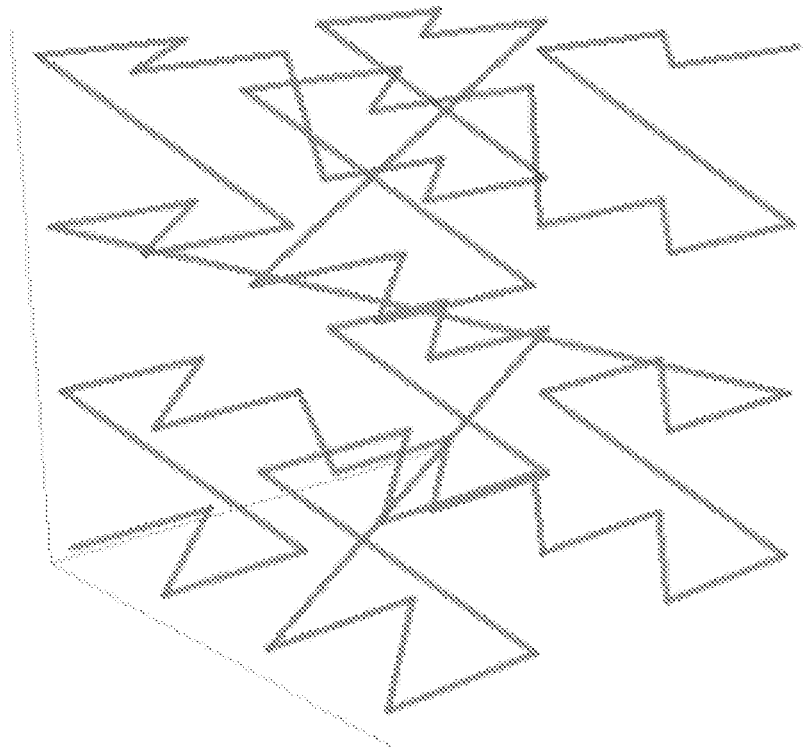
FIG. 5 is schematic diagram 3 of spatial encoding.
Figure 6:
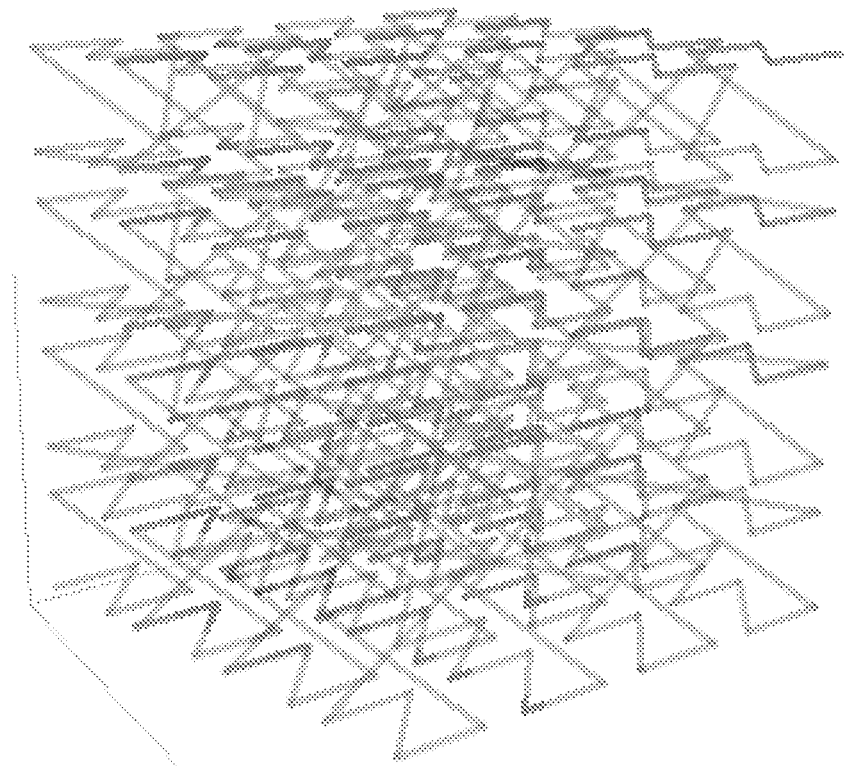
FIG. 6 is schematic diagram 4 of spatial encoding.

FIG. 5 is schematic diagram 3 of spatial encoding. FIG. 6 is schematic diagram 4 of spatial encoding. This is the case of extending to three dimensions. The recursive process is illustrated in FIG. 5 and FIG. 6, which achieves coordinate interleaving. The whole process is to continuously scatter the coordinate values. x|(y<<1)|(z<<2); that is, each coordinate value is scattered, and is interleaved in turn, first z, then y, and finally x. The decoding process is the aggregation process.

Figure 7:
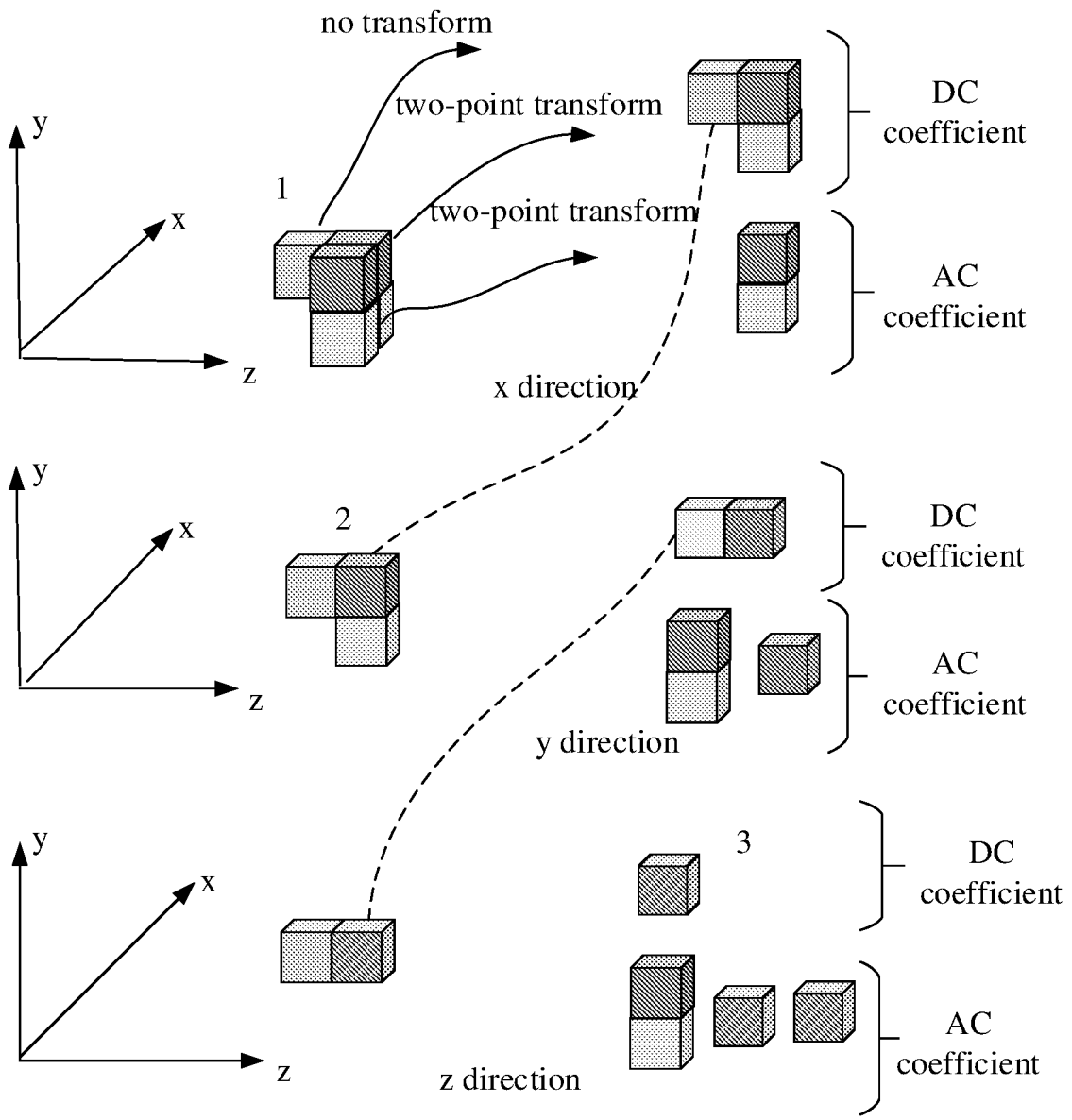
FIG. 7 is schematic diagram 1 of region adaptive hierarchal transform (RAHT).

RAHT is performed based on a hierarchical structure which is obtained by performing octree partition on the point cloud data. From the bottom layer of the octree, the transform is performed hierarchically. FIG. 7 is schematic diagram 1 of RAHT. As illustrated in FIG. 7, voxel block 1 is obtained after the octree partition is completed (that is, the geometry with three alternating colour depths in FIG. 7, where each square represents a point in the point cloud). RAHT is performed from the bottom layer, and as an example, the transform order is the X-Y-Z order. As illustrated in FIG. 7, RAHT is performed first in the X direction. If there are neighbouring voxel blocks in the X direction, RAHT is performed on them, to obtain the weighted average (DC coefficient) and residual (AC coefficient) of attribute values of the two neighbouring points. The obtained DC coefficient exists as attribute information of voxel block 2 of the parent node, and RAHT is performed at the next layer; while the AC coefficient is kept and used in the final encoding. If there is no neighbouring point, the attribute value of this voxel block is directly transferred to the parent node at the second layer. At the second layer, RAHT is performed in the Y direction, if there are neighbouring voxel blocks in the Y direction, RAHT is performed on them, to obtain the weighted average (DC coefficient) and residual (AC coefficient) of the attribute values of the two neighbouring points. Thereafter, at the third layer, RAHT is performed in the Z direction, and voxel block 3 of the parent node with three alternating colour depths is obtained as the child node at the next layer in the octree. Repeat RAHT in the x, y, and Z directions until there is only one parent node in the entire point cloud.

In practice, when the points in the point cloud are traversed, the sorted Morton code of the point cloud is used. That is, whether two child nodes are under a same parent node are determined by determining whether values after the Morton code is shifted by one bit to the right are equal.

For the attribute values $c_1$, $c_2$ of the two neighbouring points, the specific RAHT process is as follows:

$$\begin{bmatrix} DC \\ AC \end{bmatrix} = \begin{bmatrix} 1-b & b \\ -\frac{1}{a} & \frac{1}{a} \end{bmatrix} \begin{bmatrix} c_1 \\ c_2 \end{bmatrix}, \quad (5)$$

where $$w = w_1 + w_2 \quad (6)$$

$$b = \frac{w_1}{w_1 + w_2} \quad (7)$$

$$a = \sqrt{(\text{luma})^2 \frac{w_1 + w_2}{w_1 w_2}}. \quad (8)$$

luma is configured with incoming quantized parameters, and w is the weight corresponding to the DC coefficient, which is obtained through calculation. The DC coefficient is the weighted average of the attributes, and the AC coefficient is the residual of the attributes of the two neighbouring points. At the first layer, the attribute values $c_1$, $c_2$ correspond to $w_1$, $w_2$, used to calculate DC coefficient values at the other layers.

In the implementations of this application, the specific steps of RAHT are as follows.

(1) Use the attribute values of the points in the point cloud as DC coefficients at the first layer and set their weights to be 1, and start RAHT.

(2) The DC coefficient and AC coefficient at this layer are filled into the parent layer and parent node at the next layer according to the corresponding index, if any. Leave it blank if there is no AC coefficient.

(3) According to each index sorted based on the Morton code, traverse the DC coefficient corresponding to the index.

(4) Shift Morton codes corresponding to all DC coefficients by one bit to the right. In this case, the Morton code of each DC coefficient represents the Morton code of its parent node.

Figure 8:
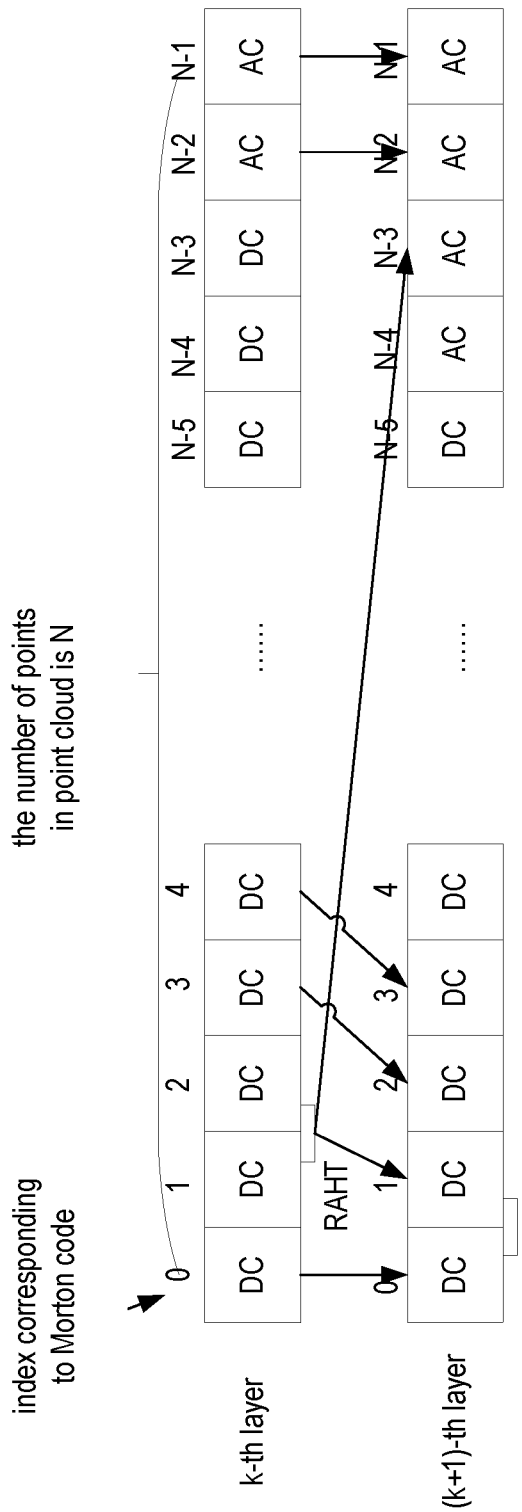
FIG. 8 is schematic diagram 2 of RAHT.

(5) FIG. 8 is schematic diagram 2 of RAHT. As illustrated in FIG. 8, determine whether Morton codes of two DC coefficients are the same. If they are the same, they are under the same parent node. RAHT is performed on them, the obtained DC coefficient is filled into the DC coefficient of the parent node at the next layer and the AC coefficient is filled into the last DC coefficient at the next layer, and the weight of the sum of the two DC coefficients is assigned to the DC coefficient of the parent node. If they are different, fill this DC coefficient and its weight directly into the next layer.

(6) Repeat (2)-(5) until there is only one DC coefficient in a certain layer.

(7) Finally, the DC coefficients are quantized, and the DC coefficients and AC coefficients of the attribute values at this layer are encoded.

Accordingly, in the block diagram of the decoder, the transform order of RAHT also needs to be used in the inverse RAHT.

The following describes RAHT in the decoding process.

RAHT in decoding process is inverse transform of RAHT in encoding process. The same as the encoding process, before the inverse transform is performed, first calculate the Morton code of each point in the point cloud. After the Morton code M of each point is obtained, sort the points in the point cloud in an ascending order and set the weight of each point to be 1. In the inverse RAHT, all points in the point cloud are traversed according to the order of the sorted Morton code.

Since RAHT is performed in a layered manner, from the bottom layer, the neighbouring points in the point cloud are determined layer by layer, and RAHT is performed on the attribute value according to the weight. The inverse RAHT starts from the top layer and is from top to bottom. Therefore, before the inverse RAHT, the weight information of each layer needs to be obtained.

Before the inverse RAHT, using the obtained Morton code information, starting from the bottom layer, at the encoding end, RAHT is performed at each layer and neighbouring nodes are determined, and then the weight information of each layer and the corresponding position of the AC coefficient can be obtained. Each time RAHT is performed at each layer, the corresponding Morton code is shifted by one bit to the left. The weight information, and the Morton code information corresponding to nodes in each layer are recorded in the buffer, for later use.

Figure 9:
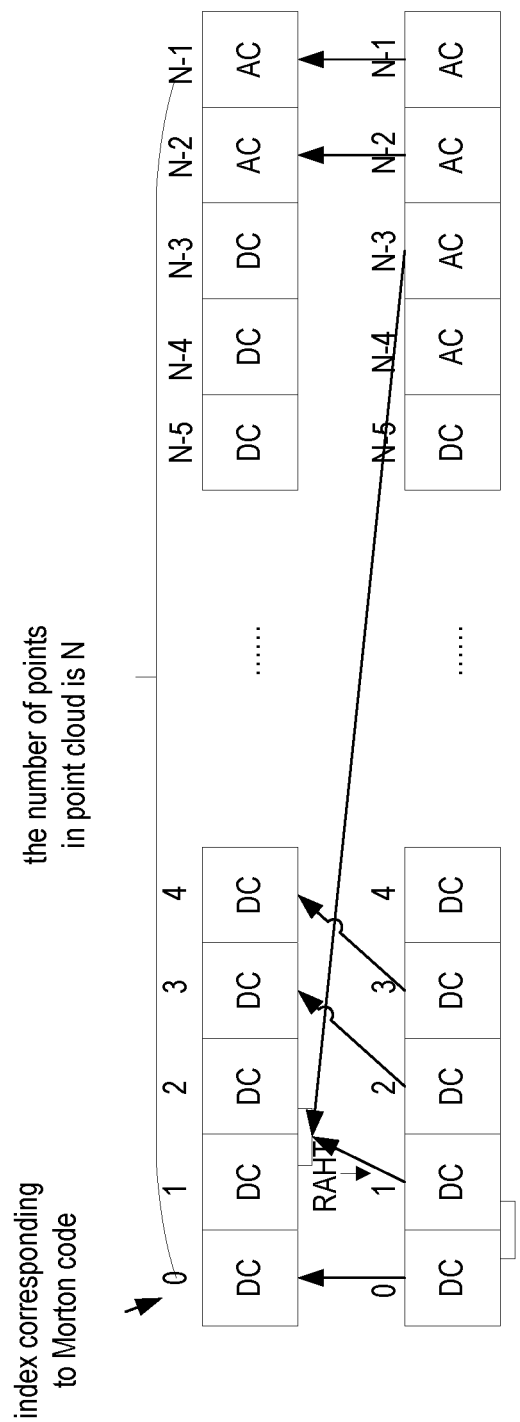
FIG. 9 is schematic diagram 3 of RAHT.

In the inverse RAHT, from the top layer, the neighbouring nodes are determined according to the Morton code information of each layer, and the inverse RAHT is performed using the obtained weight information and the decoded attribute information. FIG. 9 is schematic diagram 3 of RAHT. As illustrated in FIG. 9, the inverse RAHT is equivalent to the process from the (k+1)-th layer to the k-th layer. When the neighboring nodes are determined, the traversed DC coefficients and the corresponding AC coefficients are used to perform the inverse transform of RAHT.

In more detail, for the attribute values $c_1$, $c_2$ of the two neighbouring points, the specific inverse RAHT process is illustrated in the following formula.

$$\begin{bmatrix} c_1 \\ c_2 \end{bmatrix} = \begin{bmatrix} 1 & -ab \\ 1 & a(1-b) \end{bmatrix} \begin{bmatrix} DC \\ AC \end{bmatrix} \quad (9)$$

Specifically, when RAHT is performed on the attribute information of the point cloud in a layered manner, RAHT is performed iteratively for each node along three axes in a fixed order in each layer. However, for any point cloud, using the same fixed order to perform RAHT does not fully demonstrate the transform efficiency of RAHT. For example, currently, in G-PCC, the fixed order generally used is ZYX, but there are other possible transform orders, such as X-Y-Z. The use of the ZYX order for performing RAHT on the nodes in the point cloud leads to low transform efficiency, which reduces the coding efficiency.

To overcome the above drawbacks, implementations of this application provide a point cloud encoding and decoding method, an encoder, a decoder, and a computer storage medium. At the encoding side, the encoder can first determine the processing order of transform corresponding to the point cloud data, signal the processing order into the bitstream while performing RAHT according to the processing order, and transmit the processing order to the decoder. At the decoding side, the decoder parses the bitstream to obtain the processing order of the transform corresponding to the point cloud data, so that RAHT can be performed according to the processing order. It can be seen, in the point cloud encoding and decoding method provided in this application, for all or part of data in the point cloud, a fixed order is no longer used to perform RAHT, but a syntax element in the bitstream is used to indicate the processing order. In this way, the coordinate processing order during coding can be changed adaptively and the transform efficiency of RAHT can be further fully showed. As such, the problem of low transform efficiency can be solved and the coding efficiency can be greatly improved.

It is understandable that, in this application, the point cloud encoding method in the implementations of this application can be applied to RAHT as illustrated in FIG. 1. Accordingly, the point cloud decoding method of the implementations of this application can also be applied to RAHT as illustrated in FIG. 2. In other words, the point cloud encoding and decoding method in the implementations of this application can be applied to a video encoding system or a video decoding system, or even to both a video encoding system and a video decoding system, which is not specifically limited in the implementations of this application.

The technical solutions in the implementations of this application will be clearly and completely described below in conjunction with the drawings in the implementations of this application.

Figure 10:
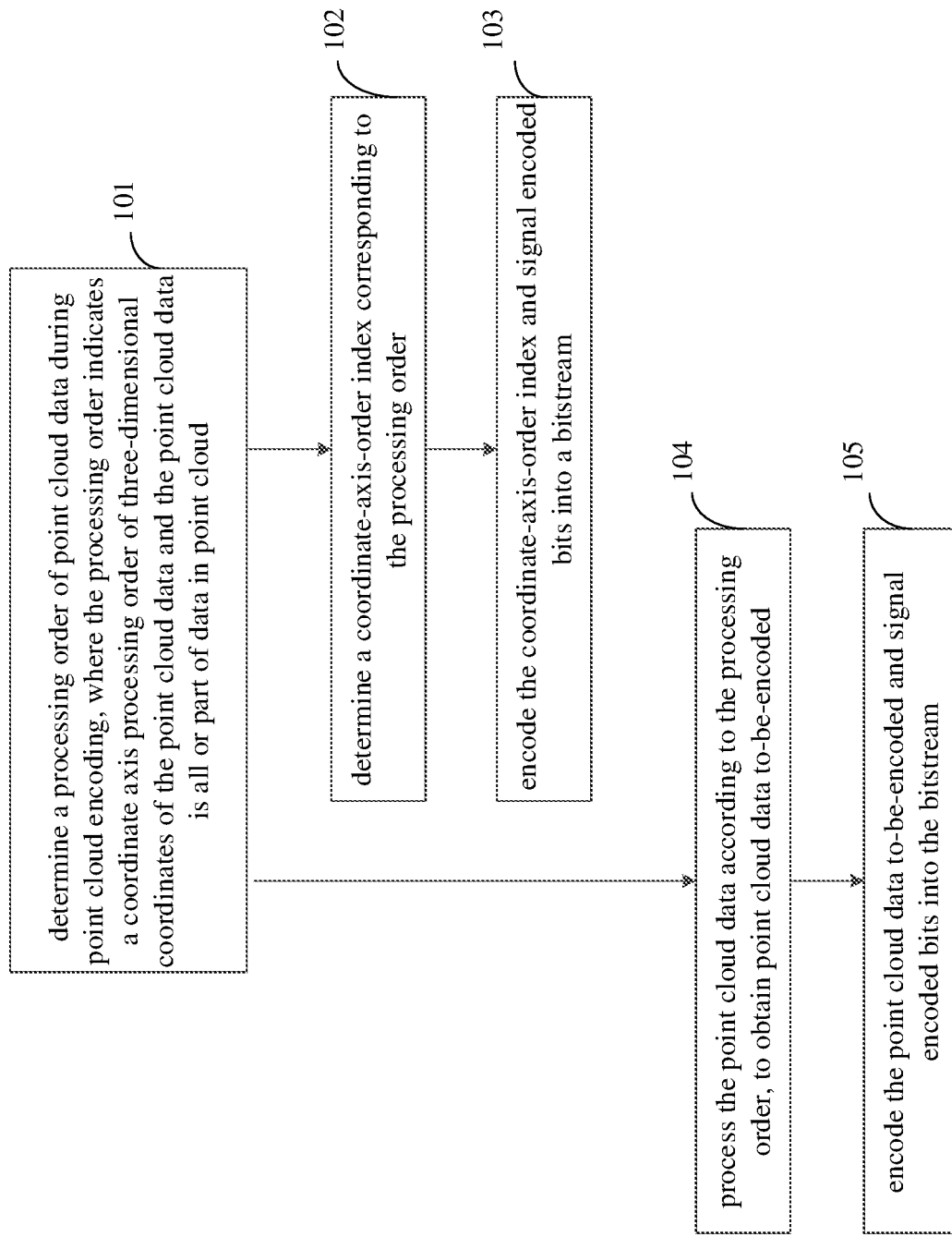
FIG. 10 is schematic diagram 1 of an implementation process of point cloud encoding.

A point cloud encoding method is provided in an implementation of this application. FIG. 10 is schematic diagram 1 of an implementation process of point cloud encoding. As illustrated in FIG. 10, in the implementation of this application, a method performed by an encoder for encoding point cloud data includes the following.

At 101, a processing order of point cloud data during point cloud encoding is determined, where the processing order indicates a coordinate axis processing order of three-dimensional coordinates of the point cloud data and the point cloud data is all or part of data in point cloud.

In the implementation of this application, the encoder can first determine the processing order of the point cloud data during point cloud encoding. The point cloud data is all or part of data in the point cloud and the processing order can be used to indicate the coordinate axis processing order of the three-dimensional coordinates of the point cloud data.

It is understandable that, in the implementation of this application, the point cloud data may be all data in the point cloud. Accordingly, determining the processing order of the point cloud data means determining a processing order of all data in the point cloud. That is, in this application, for each point in the point cloud, the encoder may use the same processing order for transform.

Furthermore, in the implementation of this application, the encoder can obtain multiple slices corresponding to the point cloud by partitioning the point cloud. Therefore, the point cloud data can also be part of data in the point cloud, that is, the point cloud data can be data of any slice in the point cloud. Accordingly, determining the processing order of the point cloud data is determining a processing order of data of any slice in the point cloud. That is, in this application, for each point of the same slice in the point cloud, the encoder may use the same processing order for transform.

It is understandable that, in the implementation of this application, the processing order is a transform order used in RAHT. Each point in the point cloud is point cloud data with three dimensions of X, Y, and Z. Therefore, the processing order indicates the order in which the transform is sequentially performed in the three coordinate axes of X, Y, and Z.

Exemplary, in the implementation of this application, when RAHT is performed on attribute information of the point cloud in a hierarchical manner, in each layer, based on the processing order, RAHT is performed iteratively for each node along three axes. For example, if the processing order is X-Y-Z, the encoder can perform RAHT on the nodes in the point cloud first in X axis, then in Y axis, and last in Z axis. If the processing order is Y-Z-X, then the encoder can perform RAHT on the nodes in the point cloud first in Y axis, then in Z axis, and last in X axis.

It is understandable that, in the implementation of this application, because each point in the point cloud is point cloud data with three dimensions of X, Y, and Z, the order in which the encoder performs RAHT can include six different combinations, that is, the processing order can include six different transform orders.

Furthermore, in the implementation of this application, the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

It should be noted that, in the implementation of this application, when determining the processing order of the point cloud data during point cloud encoding, the encoder can determine the processing order according to a Morton code of each node in the point cloud data.

Specifically, in the implementation of this application, the encoder can first calculate the Morton code of each node in the point cloud data, then sort the nodes in the point cloud data according to an ascending order of the Morton code, and finally traverse each node in the point cloud data in the sorted order.

At 102, a coordinate-axis-order index corresponding to the processing order is determined.

In the implementation of this application, after determining the processing order of the point cloud data during point cloud encoding, the encoder can further determine the coordinate-axis-order index (i.e., index number) corresponding to the processing order.

It is understandable that, for different processing orders, the encoder can set different coordinate-axis-order indexes. Accordingly, since the processing order can be any of six different transform orders, the coordinate-axis-order index can also include six different values.

Furthermore, in the implementation of this application, when the encoder determines the coordinate-axis-order index corresponding to the processing order, the encoder can set a value of the coordinate-axis-order index corresponding to the processing order according to a correspondence table between preset indexes and processing orders.

Specifically, in this application, Table 1 is a correspondence table 1 between preset indexes and processing orders. As illustrated in Table 1, for different processing orders, a corresponding coordinate-axis-order index can be determined by querying the correspondence table between the preset indexes and the processing orders.

TABLE 1

| coordinate-axis-order index | processing order |
| --- | --- |
| 0 | Z-Y-X order |
| 1 | X-Y-Z order |
| 2 | X-Z-Y order |
| 3 | Y-Z-X order |
| 4 | Z-Y-X order |
| 5 | Z-X-Y order |
| 6 | Y-X-Z order |
| 7 | X-Y-Z order |

It can be seen from Table 1 above that, in this application, the processing order and the coordinate-axis-order index are not in one-to-one correspondence. For six kinds of transform orders of RAHT, the Z-Y-X order corresponds to two different coordinate-axis-order indexes. Specifically, the Z-Y-X order corresponds to index 0 and index 4, respectively. The X-Y-Z order corresponds to two different coordinate-axis-order indexes. Specifically, the X-Y-Z order corresponds to index 1 and index 7, respectively. The other four RAHT orders other than the Z-Y-X order and the X-Y-Z order respectively correspond to a unique coordinate-axis-order index. The X-Z-Y order corresponds to index 2, the Y-Z-X order corresponds to index 3, the Z-X-Y order corresponds to index 5, and the Y-X-Z order corresponds to index 6.

Exemplarily, in this application, the encoder sets the value of the coordinate-axis-order index corresponding to the processing order according to the correspondence table between the preset indexes and the processing orders. If the processing order of the point cloud data is the Z-Y-X order, the encoder can set the value of the coordinate-axis-order index to be 0 or 4. If the processing order of the point cloud data is the X-Y-Z order, the encoder can set the value of the coordinate-axis-order index to be 1 or 7. If the processing order of the point cloud data is the X-Z-Y order, the encoder can set the value of the coordinate-axis-order index to be 2. If the processing order of the point cloud data is the Y-Z-X order, the encoder can set the value of the coordinate-axis-order index to be 3. If the processing order of the point cloud data is the Z-X-Y order, the encoder can set the value of the coordinate-axis-order index to be 5. If the processing order of the point cloud data is the Y-X-Z order, the encoder can set the value of the coordinate-axis-order index to be 6.

It should be noted that, in this application, there is no specific concept of X, Y, and Z coordinate axes in G-PCC. In general, on the basis of the X, Y, and Z coordinate axes, the coordinate axis processing order can be represented by 0, 1, and 2. For example, if the processing order is the X-Y-Z order, it can be indicated by 0-1-2.

Based on Table 1 above, Table 2 is a correspondence table 2 between preset indexes and processing orders. As illustrated in Table 2, for different processing orders, a corresponding coordinate-axis-order index can be determined by querying the correspondence table between the preset indexes and the processing orders.

TABLE 2

| coordinate-axis-order index | X | Y | X |
| --- | --- | --- | --- |
| 0 | 2 | 1 | 0 |
| 1 | 0 | 1 | 2 |
| 2 | 0 | 2 | 1 |
| 3 | 2 | 0 | 1 |
| 4 | 2 | 1 | 0 |
| 5 | 1 | 2 | 0 |
| 6 | 1 | 0 | 2 |
| 7 | 0 | 1 | 2 |

Exemplarily, in this application, the encoder sets the value of the coordinate-axis-order index corresponding to the processing order according to the correspondence table between the preset indexes and the processing orders. If the processing order of the point cloud data is the Z-Y-X order, that is, the processing order is indicated by 2-1-0, the encoder can set the value of the coordinate-axis-order index to be 0 or 4. If the processing order of the point cloud data is the X-Y-Z order, that is, the processing order is indicated by 0-1-2, the encoder can set the value of the coordinate-axis-order index to be 1 or 7. If the processing order of the point cloud data is the X-Z-Y order, that is, the processing order is indicated by 0-2-1, the encoder can set the value of the coordinate-axis-order index to be 2. If the processing order of the point cloud data is the Y-Z-X order, that is, the processing order is indicated by 2-0-1, the encoder can set the value of the coordinate-axis-order index to be 3. If the processing order of the point cloud data is the Z-X-Y order, that is, the processing order is indicated by 1-2-0, the encoder can set the value of the coordinate-axis-order index to be 5. If the processing order of the point cloud data is the Y-X-Z order, that is, the processing order is indicated by 1-0-2, the encoder can set the value of the coordinate-axis-order index to be 6.

It is understandable that, in this application, the coordinate-axis-order index can be represented by the syntax axis_coding_order, that is, the processing order of the three coordinate axes X, Y, and Z can be specified by the syntax axis_coding_order. Specifically, based on the above Table 2, the axis_coding_order for the G-PCC standard can be used to process data in the RecPic[pointIdx][axis] buffer. For example, when the value of axis_coding_order is equal to 0, that is, the processing order is Z-Y-X, if the value of axis is equal to 0, RecPic[pointIdx][0] stores data of the Z axis; if the value of axis is equal to 1, RecPic[pointIdx][1] stores data of the Y axis; if the value of axis is equal to 2, RecPic[pointIdx][2] stores data of the X axis.

At 103, the coordinate-axis-order index is encoded and encoded bits are signalled into a bitstream.

In the implementation of this application, after determining the coordinate-axis-order index corresponding to the processing order, the encoder can further encode the coordinate-axis-order index and signal the encoded bits into the bitstream.

Furthermore, in the implementation of this application, when the encoder encodes the coordinate-axis-order index and signals the encoded bits into the bitstream, the encoder can first encode the coordinate-axis-order index by using fixed length coding, determine the encoded bits, and then signal the encoded bits into the bitstream.

It is understandable that, in this application, fixed length coding means that any value (probability may be different) of the output symbol sequence of the information source is encoded into an output code word of the same length, without using the statistical characteristics of the information source. After encoding the coordinate-axis-order index by using fixed length coding, the encoder obtains the fixed length code of the same length.

Furthermore, in the implementation of this application, when the encoder encodes the coordinate-axis-order index and signals the encoded bits into the bitstream, the encoded bits can be signalled into a bitstream corresponding to a data unit of a parameter set, where the data unit of the parameter set contains parameters used for decoding the point cloud data.

It should be noted that, in the implementation of this application, the parameter set may be a sequence-layer parameter set.

Furthermore, in the implementation of this application, the parameter set may also be a sequence parameter set.

It should be noted that, in the implementation of this application, the data unit of the parameter set may contain attribute information of the point cloud data and the attribute information is a scalar attribute or a vector attribute associated with a point in the point cloud data.

It can be understood that, in the implementation of this application, the data unit of the parameter set may also contain geometry information of the point cloud data and the geometry information is Cartesian coordinates associated with a point in the point cloud data.

Furthermore, in the implementation of this application, when the encoder encodes the coordinate-axis-order index and signals the encoded bits into the bitstream, the encoded bits can be signalled into a data unit where auxiliary information of the bitstream is located.

Exemplarily, in the implementation of this application, the auxiliary information may be video usability information (VUI).

The video usability information provides additional information for the corresponding bitstream to allow wider application for users. For example, in the bitstream constraint information, the video usability information specifies: (1) whether the motion crosses the boundary of the picture; (2) the maximum byte per picture; (3) the maximum bit per macro block; (4) the length of the maximum motion vector (horizontal and vertical); (5) the number of resorted frames; (6) the size of the maximum decoded frame buffer. When the decoder sees this information, the decoder does not use the "level" information to set the decoding requirements (which is generally higher than the actual requirements of the bitstream), but can customize its decoding operations based on stricter constraints.

Exemplarily, in the implementation of this application, the auxiliary information may also be supplemental enhancement information (SEI). SEI is a concept in the category of bitstream, which provides a way to add information to the video bitstream, and is one of the characteristics of the H.264/H.265 video compression standard.

SEI is not a necessary option for the decoding process, which may be helpful to the decoding process (error tolerance, error correction) and can be integrated in the video bitstream. That is, when the encoder outputs the video bitstream, it may not provide SEI, or the SEI may be discarded for some reason at the video transmission process, de-capsulation, and decoding.

It can be understood that, in the implementation of this application, when the encoder encodes the coordinate-axis-order index and signals the encoded bits into the bitstream, the encoded bits can be signalled into a transmission stream containing point cloud encoding data corresponding to the point cloud data. That is, the bitstream can be the transmission stream containing the point cloud encoding data.

Furthermore, in the implementation of this application, when the encoder encodes the coordinate-axis-order index and signals the encoded bits into the bitstream, the encoded bits can be signalled into a media file containing point cloud encoding data corresponding to the point cloud data. That is, the bitstream can be the media file containing the point cloud encoding data.

That is, in this application, the coordinate-axis-order index axis_coding_order can be encoded in the auxiliary information (for example, VUI) of the sequence parameter set (SPS), encoded in the data unit of other auxiliary information (for example, SEI) of the point cloud data, or also be encoded in the unit of the auxiliary information in the format of transmission stream or file.

At 104, the point cloud data is processed according to the processing order, to obtain point cloud data to-be-encoded.

In the implementation of this application, after determining the processing order of the point cloud data during point cloud encoding, that is, after 101, the encoder processes the point cloud data according to the processing order, to obtain point cloud data to-be-encoded.

It can be understood that, in the implementation of this application, the processing order is the transform order when RAHT is performed on the attribute information of the point cloud. Therefore, after the encoder determines the processing order, it can use the processing order to perform RAHT on the point cloud data, so as to obtain the corresponding point cloud data to-be-encoded.

It should be noted that, in the implementation of this application, since the point cloud data may be all data in the point cloud, the processing order may be the transform order of all data in the point cloud. Furthermore, after determining the processing order, the encoder can sequentially perform RAHT on each point in the point cloud according to the processing order.

Furthermore, in the implementation of this application, since the point cloud data may also be part of data in the point cloud, that is, the point cloud data may be data of any slice in the point cloud, the processing order can also be the transform order of part of data in the point cloud. Furthermore, after determining the processing order corresponding to a certain slice in the point cloud, the encoder can sequentially perform RAHT on each point in this slice according to the processing order.

That is to say, in this application, if the processing order is the transform order of all data in the point cloud, the encoder can use the same transform order to perform RAHT on the all data in the point cloud. If the processing order is the transform order of part of data in the point cloud, the encoder can use the same transform order to perform RAHT on the part of data in the point cloud. For example, for data in a slice after partition, the same transform order can be used for RAHT.

Furthermore, in the implementation of this application, when the encoder processes the point cloud data according to the processing order, to obtain the point cloud data to-be-encoded, the encoder can first perform coordinate mapping on the point cloud data according to the processing order.

Specifically, in the implementation of this application, when the encoder performs coordinate mapping on the point cloud data according to the processing order, the encoder can rearrange the coordinates of the point cloud data according to the processing order.

Furthermore, in the implementation of this application, when the encoder processes the point cloud data according to the processing order, to obtain the point cloud data to-be-encoded, the encoder can process sequentially, according to the processing order, the point cloud data in a corresponding coordinate axis direction.

It should be noted that, in this application, the execution process of RAHT is to: first transform in one coordinate direction, then transform in another coordinate direction, and finally transform in the third coordinate direction.

It can be understood that, in the implementation of this application, when the encoder processes sequentially, according to the processing order, the point cloud data in the corresponding coordinate axis direction, the encoder can perform sequentially, according to the processing order, RAHT on the point cloud data in the corresponding coordinate axis direction.

Furthermore, in the implementation of this application, when the decoder performs sequentially, according to the processing order, RAHT on the point cloud data in the corresponding coordinate axis direction, the encoder can first determine a Morton code of a node in the point cloud data and perform RAHT on the point cloud data according to the processing order and the Morton code.

Furthermore, in the implementation of this application, when the encoder performs RAHT on the point cloud data according to the processing order and the Morton code, the encoder may first determine whether the processing order is a same as a preset order.

It can be understood that, in the implementation of this application, the preset order may be a default transform order pre-stored by the encoder. For example, the encoder can set the Z-Y-X order as the preset order.

Furthermore, in the implementation of this application, the encoder can compare the processing order with the preset order. The encoder performs RAHT on the point cloud data directly according to the preset order and the Morton code, if the processing order is the same as the preset order. The encoder performs RAHT on the point cloud data according to the processing order and the Morton code, if the processing order is different from the preset order.

Figure 11:
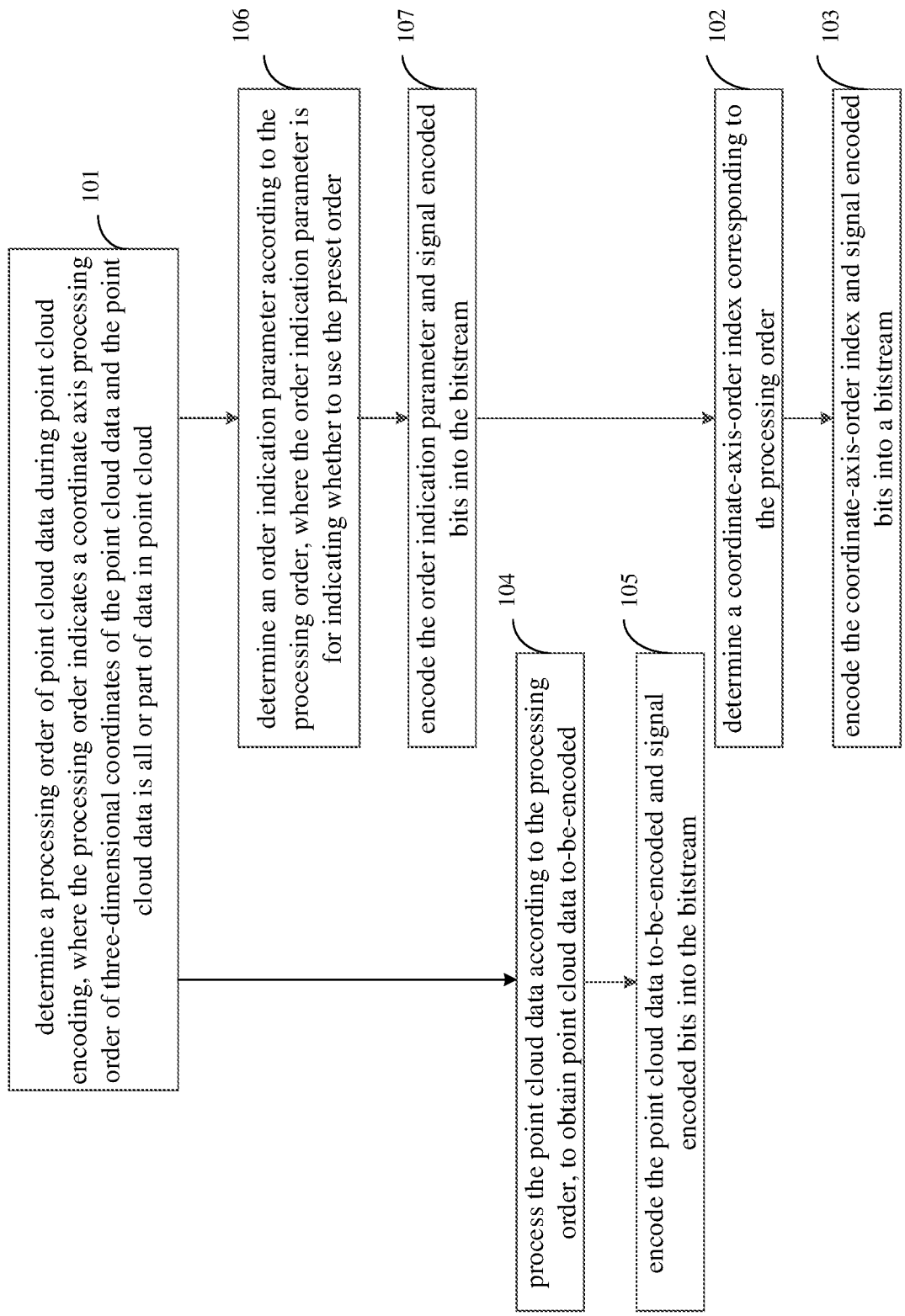
FIG. 11 is schematic diagram 2 of an implementation process of point cloud encoding.

It should be noted that, in implementations of this application, FIG. 11 is schematic diagram 2 of an implementation process of point cloud encoding. As illustrated in FIG. 11, after the encoder determines the processing order of the point cloud data during point cloud encoding, i.e., after 101, and before the encoder determines the coordinate-axis-order index corresponding to the processing order, i.e., before 102, the method performed by the encoder for encoding the point cloud data further includes the following.

At 106, an order indication parameter is determined according to the processing order, where the order indication parameter is for indicating whether to use the preset order.

At 107, the order indication parameter is encoded and encoded bits are signalled into the bitstream.

After determining the processing order of the point cloud data, the encoder can first set the order indication parameter according to the processing order, then encode the order indication parameter, and write the encoded bits into the bitstream.

It should be noted that, in the implementation of this application, the order indication parameter may be used to indicate whether to use the preset order. That is, if the encoder uses the preset order for transform, the order indication parameter can be set to indicate that the preset order is used. If the encoder does not use the preset order for transform, the order indication parameter can be set to indicate that the preset order is not used.

Furthermore, in the implementation of this application, the encoder determines the order indication parameter according to the processing order. If the processing order is different from the preset order, the encoder needs to transform the point cloud data according to the processing order, so a value of the order indication parameter can be set to be indicative of not using the preset order. If the processing order is the same as the preset order, the encoder can transform the point cloud data according to the preset order, so the value of the order indication parameter can be set to be indicative of using the preset order.

Exemplarily, in this application, when setting the order indication parameter, the encoder may set the value of the order indication parameter to 0, indicating that the preset order is not used, or set the value of the order indication parameter to 1, indicating that the preset order is used.

It is understandable that, in this application, the order indication parameter can be characterized by the syntax attr_raht_order_default_flag. Specifically, if the value of attr_raht_order_default_flag is equal to 1, it indicates that the preset order is used; if the value of attr_raht_order_default_flag is equal to 0, it indicates that the preset order is not used.

At 105, the point cloud data to-be-encoded is encoded and encoded bits are signalled into the bitstream.

In the implementation of this application, after the encoder processes the point cloud data according to the processing order to obtain the point cloud data to-be-encoded, the encoder can encode the point cloud data to-be-encoded and signal the encoded bits into the bitstream.

According to the point cloud encoding method proposed in the above steps 101 to 107, the encoder no longer uses the fixed transform order to perform RAHT on the point cloud data, as proposed in the prior art. For example, the X-Y-Z order is used to perform RAHT on all point cloud data. Instead, during encoding the point cloud data, the processing order corresponding to the point cloud data is determined before the transform, and then the processing order is used to perform RAHT.

It can be understood that, in this application, from the perspective of the processing order of the three coordinates of X, Y, and Z, currently, in G-PCC, the encoder performs transform in a fixed order. In contrast, in the point cloud encoding method proposed in this application, the processing order of the encoder on the three coordinates in G-PCC can be changed adaptively, thereby improving encoding efficiency.

It should be noted that, in this application, the flexibility of the processing order can be constrained to the sequence layer, and the entire point cloud can use the same coordinate processing order, that is, partitions in the point cloud (such as slices) all use the same coordinate processing order.

It is understandable that, in this application, the encoding end may preprocess the point cloud data before encoding the point cloud data. Specifically, the encoder can reset the X, Y, and Z coordinate axes of the point cloud data and re-determine the processing order. Thereafter, the encoder encodes the preprocessed point cloud data, and from the perspective of display, indicates the preprocessing method at the sequence layer, that is, after encoding the coordinate-axis-order index corresponding to the processing order, the encoder signals the encoded bits into the bitstream. Therefore, after the bitstream is transmitted to the decoding end, the decoder decodes the bitstream to obtain the decoded point cloud, and performs post-processing on the point cloud according to the preprocessing method indicated by the sequence layer. That is, the decoding end parses to obtain the coordinate-axis-order index, and determines the processing order indicated by the coordinate-axis-order index, so that the X, Y, and Z coordinate axes of the point cloud data can be adaptively set.

Implementations of this application provide the point cloud encoding method. The encoder determines the processing order of point cloud data during point cloud encoding, where the processing order indicates the coordinate axis processing order of the three-dimensional coordinates of the point cloud data and the point cloud data is all or part of data in the point cloud. The encoder determines the coordinate-axis-order index corresponding to the processing order. The encoder encodes the coordinate-axis-order index and signals the encoded bits into the bitstream. The encoder processes the point cloud data according to the processing order, to obtain the point cloud data to-be-encoded. The encoder encodes the point cloud data to-be-encoded and signals the encoded bits into the bitstream. That is, in the implementations of this application, at the encoding side, the encoder can first determine the processing order of transform corresponding to the point cloud data, signal the processing order into the bitstream while performing RAHT according to the processing order, and transmit the processing order to the decoder. At the decoding side, the decoder parses the bitstream to obtain the processing order of the transform corresponding to the point cloud data, so that RAHT can be performed according to the processing order. It can be seen, in the point cloud encoding and decoding method provided in this application, for all or part of data in the point cloud, a fixed order is no longer used to perform RAHT, but a syntax element in the bitstream is used to indicate the processing order. In this way, the coordinate processing order during coding can be changed adaptively and the transform efficiency of RAHT can be further fully showed. As such, the problem of low transform efficiency can be solved and the coding efficiency can be greatly improved.

Figure 12:
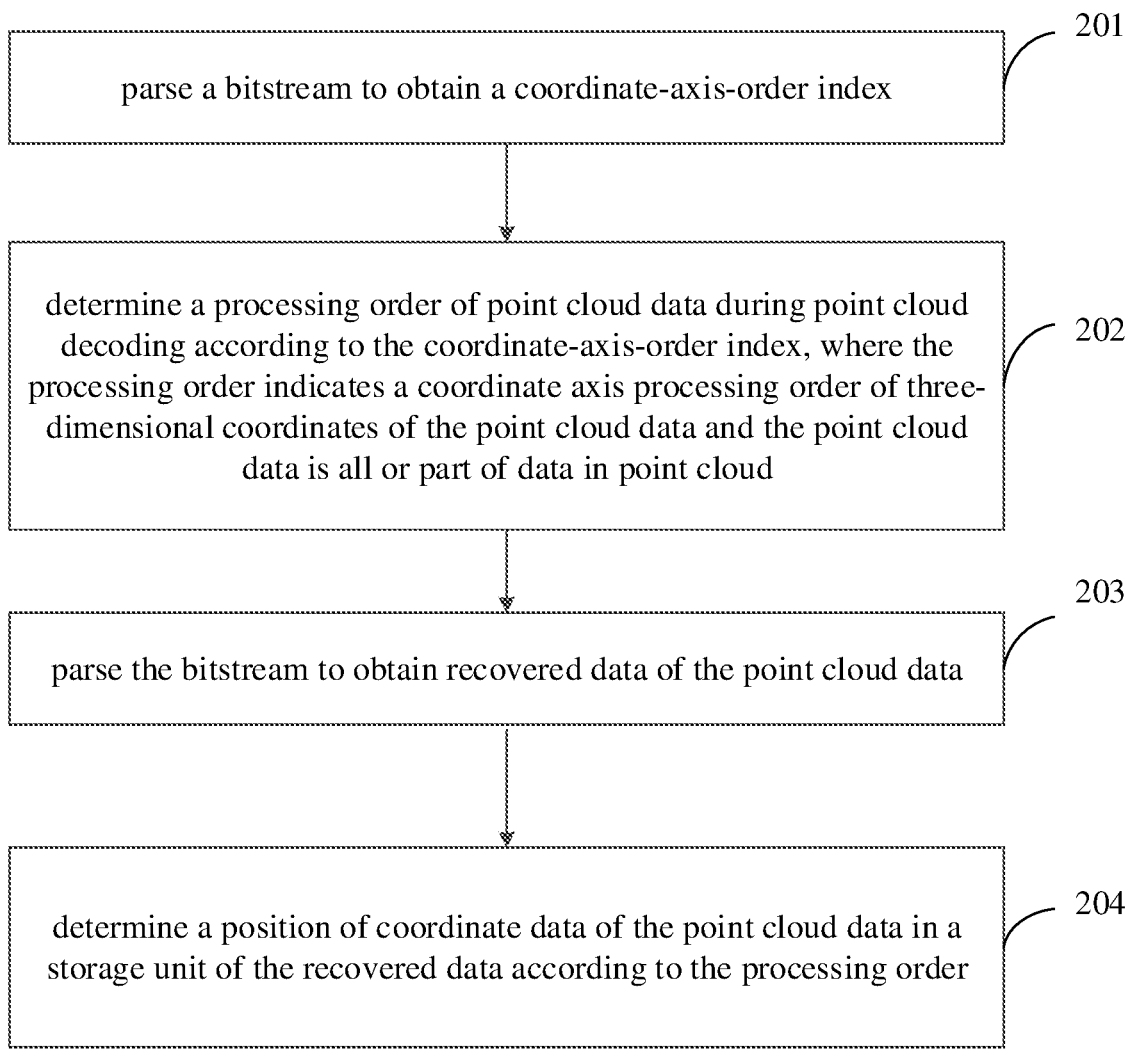
FIG. 12 is schematic diagram 1 of an implementation process of point cloud decoding.

Based on the above implementations, a point cloud decoding method is provided in another implementation of this application. FIG. 12 is schematic diagram 1 of an implementation process of point cloud decoding. As illustrated in FIG. 12, in the implementation of this application, a method performed by a decoder for decoding point cloud data includes the following.

At 201, a bitstream is parsed to obtain a coordinate-axis-order index.

In the implementation of this application, the decoder parses the bitstream to obtain the coordinate-axis-order index of the point cloud data.

It should be noted that, in the implementation of this application, the coordinate-axis-order index obtained by the decoder through parsing the bitstream may be used to indicate the processing order.

Specifically, in this application, since the processing order can be any of six different transform orders, the coordinate-axis-order index obtained by the decoder through parsing may also include six different values.

It is understandable that, in this application, the coordinate-axis-order index can be represented by the syntax axis_coding_order, that is, the processing order of the three coordinate axes X, Y, and Z can be specified by the syntax axis_coding_order. Specifically, based on the above Table 2, the axis_coding_order for the G-PCC standard can be used to process data in the RecPic[pointIdx][axis] buffer. For example, when the value of axis_coding_order is equal to 0, that is, the processing order is Z-Y-X, if the value of axis is equal to 0, RecPic[pointIdx][0] stores data of the Z axis; if the value of axis is equal to 1, RecPic[pointIdx][1] stores data of the Y axis; if the value of axis is equal to 2, RecPic[pointIdx][2] stores data of the X axis.

Exemplarily, in the G-PCC standard text, the syntax part corresponding to coordinate-axis-order index can be as illustrated in Table 3 below.

TABLE 3

| | Descriptor |
|---|---|
| seq_parameter_set( ) { | |
| ...... | |
| axis_coding_order | u(3) |
| ...... | |
| } | |

Furthermore, in the implementation of this application, when the decoder parses the bitstream to obtain the coordinate-axis-order index, the decoder can parse a fixed length code to obtain the coordinate-axis-order index.

It can be understood that, in this application, the fixed length code is the output code word of the same length obtained after encoding using fixed length coding. In other words, the encoder obtains the fixed length code of the same length after encoding the coordinate-axis-order index using fixed length coding.

Furthermore, in the implementation of this application, when the decoder parses the bitstream to obtain the coordinate-axis-order index, the decoder can parse a bitstream corresponding to a data unit of a parameter set in the bitstream, where the data unit of the parameter set contains parameters used for decoding the point cloud data.

It should be noted that, in the implementation of this application, the parameter set can be a sequence-layer parameter set.

Furthermore, in the implementation of this application, the parameter set can also be a sequence parameter set.

It should be noted that, in the implementation of this application, the data unit of the parameter set can contain attribute information of the point cloud data, where the attribute information is a scalar attribute or a vector attribute associated with a point in the point cloud data.

It is understandable that, in the implementation of this application, the data unit of the parameter set can further contain geometry information of the point cloud data, where the geometry information is Cartesian coordinates associated with a point in the point cloud data.

Furthermore, in the implementation of this application, when the decoder parses the bitstream to obtain the coordinate-axis-order index, after the bitstream is received, the decoder parses a data unit where auxiliary information of the bitstream is located, to obtain the coordinate-axis-order index.

Exemplarily, in the implementation of this application, the auxiliary information is VUI.

Exemplarily, in the implementation of this application, the auxiliary information is SEI.

It is understandable that, in the implementation of this application, when the decoder parses the bitstream to obtain the coordinate-axis-order index, the parsed bitstream can be a transmission stream containing point cloud encoding data corresponding to the point cloud data. That is, the bitstream can be the transmission stream containing the point cloud encoding data.

Furthermore, in the implementation of this application, when the decoder parses the bitstream to obtain the coordinate-axis-order index, the parsed bitstream can be a media file containing point cloud encoding data corresponding to the point cloud data. That is, the bitstream can be the media file containing the point cloud encoding data.

That is, in this application, the coordinate-axis-order index axis_coding_order can be encoded in the auxiliary information (for example, VUI) of the SPS, encoded in the data unit of other auxiliary information (for example, SEI) of the point cloud data, or also be encoded in the unit of the auxiliary information in the format of transmission stream or file.

At 202, a processing order of point cloud data during point cloud decoding is determined according to the coordinate-axis-order index, where the processing order indicates a coordinate axis processing order of three-dimensional coordinates of the point cloud data and the point cloud data is all or part of data in point cloud.

In the implementation of this application, after the decoder parses the bitstream to obtain the coordinate-axis-order index, the decoder can determine the processing order of the point cloud data during point cloud decoding according to the coordinate-axis-order index.

It is understandable that, in this application, the processing order indicates the coordinate axis processing order of the three-dimensional coordinates of the point cloud data and the point cloud data is all or part of data in point cloud.

Furthermore, in the implementation of this application, the processing order can be used to indicate the coordinate axis processing order of the three-dimensional coordinates of the point cloud data.

It is understandable that, in the implementation of this application, the point cloud data may be all data in the point cloud. Accordingly, determining by the decoder the processing order of the point cloud data during point cloud decoding according to the coordinate-axis-order index means determining a processing order of all data in the point cloud. That is, in this application, for each point in the point cloud, the decoder may use the same processing order for transform.

Furthermore, in the implementation of this application, the encoder can obtain multiple slices corresponding to the point cloud by partitioning the point cloud. Therefore, the point cloud data can also be part of data in the point cloud, that is, the point cloud data can be data of any slice in the point cloud. Accordingly, determining by the decoder the processing order of the point cloud data during point cloud decoding according to the coordinate-axis-order index means determining a processing order of data of any slice in the point cloud. That is, in this application, for each point of the same slice in the point cloud, the decoder may use the same processing order for transform.

It is understandable that, in the implementation of this application, the processing order is a transform order used in RAHT. Each point in the point cloud is point cloud data with three dimensions of X, Y, and Z. Therefore, the processing order indicates the order in which the transform is sequentially performed in the three coordinate axes of X, Y, and Z.

Exemplary, in the implementation of this application, when RAHT is performed on attribute information of the point cloud in a hierarchical manner, in each layer, based on the processing order, RAHT is performed iteratively for each node along three axes. For example, if the processing order is X-Y-Z, the decoder can perform RAHT on the nodes in the point cloud first in X axis, then in Y axis, and last in Z axis. If the processing order is Y-Z-X, then the decoder can perform RAHT on the nodes in the point cloud in Y axis, then in Z axis, and last in X axis.

It is understandable that, in the implementation of this application, because each point in the point cloud is point cloud data with three dimensions of X, Y, and Z, the order in which the decoder performs RAHT can include six different combinations, that is, the processing order can include six different transform orders.

Specifically, for different processing orders, the encoder can set different coordinate-axis-order indexes. Accordingly, since the processing order can be any of six different transform orders, the coordinate-axis-order index can also include six different values.

Furthermore, in the implementation of this application, the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

Furthermore, in the implementation of this application, when the decoder determines the processing order of the point cloud data during point cloud decoding according to the coordinate-axis-order index, the processing order corresponding to the coordinate-axis-order index can be determined according to a correspondence table between preset indexes and processing orders.

Specifically, in this application, Table 1 above is the correspondence table 1 between the preset indexes and the processing orders. As illustrated in Table 1, for different processing orders, the corresponding coordinate-axis-order index can be determined by querying the correspondence table between the preset indexes and the processing orders.

Exemplarily, in this application, the decoder determines the processing order of the point cloud data during point cloud decoding according to the coordinate-axis-order index. If the value of the coordinate-axis-order index is 0 or 4, the decoder can determine that the corresponding processing order of the point cloud data is the Z-Y-X order. If the value of the coordinate-axis-order index is 1 or 7, then the decoder can determine that the corresponding processing order of the point cloud data is the X-Y-Z order. If the value of the coordinate-axis-order index is 2, the decoder can determine that the corresponding processing order of the point cloud data is the X-Z-Y order. If the value of the coordinate-axis-order index is 3, the decoder can determine that the corresponding processing order of the point cloud data is the Y-Z-X order. If the value of the coordinate-axis-order index is 5, then the decoder can determine that the corresponding processing order of the point cloud data is the Z-X-Y order. If the value of the coordinate-axis-order index is 6, the decoder can determine that the corresponding processing order of the point cloud data is the Y-X-Z order.

It should be noted that, in this application, there is no specific concept of X, Y, and Z coordinate axes in G-PCC. In general, on the basis of the X, Y, and Z coordinate axes, the coordinate axis processing order can be represented by 0, 1, and 2. For example, if the processing order is the X-Y-Z order, it can be indicated by 0-1-2.

Based on Table 1 above, Table 2 is a correspondence table 2 between preset indexes and processing orders. As illustrated in Table 2, for different processing orders, a corresponding coordinate-axis-order index can be determined by querying the correspondence table between the preset indexes and the processing orders.

Exemplarily, in this application, the decoder determines the processing order of the point cloud data during point cloud decoding according to the coordinate-axis-order index. If the value of the coordinate-axis-order index is 0 or 4, that is, the processing order is indicated by 2-1-0, the decoder can determine that the corresponding processing order of the point cloud data is the Z-Y-X order. If the value of the coordinate-axis-order index is 1 or 7, that is, the processing order is indicated by 0-1-2, then the decoder can determine that the corresponding processing order of the point cloud data is the X-Y-Z order. If the value of the coordinate-axis-order index is 2, that is, the processing order is indicated by 0-2-1, the decoder can determine that the corresponding processing order of the point cloud data is the X-Z-Y order. If the value of the coordinate-axis-order index is 3, that is, the processing order is indicated by 2-0-1, the decoder can determine that the corresponding processing order of the point cloud data is the Y-Z-X order. If the value of the coordinate-axis-order index is 5, that is, the processing order is indicated by 1-2-0, then the decoder can determine that the corresponding processing order of the point cloud data is the Z-X-Y order. If the value of the coordinate-axis-order index is 6, that is, the processing order is indicated by 1-0-2, the decoder can determine that the corresponding processing order of the point cloud data is the Y-X-Z order.

It is understandable that, in this application, the coordinate-axis-order index can be represented by the syntax axis_coding_order, that is, the processing order of the three coordinate axes X, Y, and Z can be specified by the syntax axis_coding_order. Specifically, based on the above Table 2, the axis_coding_order for the G-PCC standard can be used to process data in the RecPic[pointIdx][axis] buffer. For example, when the value of axis_coding_order is equal to 0, that is, the processing order is Z-Y-X, if the value of axis is equal to 0, RecPic[pointIdx][0] stores data of the Z axis; if the value of axis is equal to 1, RecPic[pointIdx][1] stores data of the Y axis; if the value of axis is equal to 2, RecPic[pointIdx][2] stores data of the X axis.

At 203, the bitstream is parsed to obtain recovered data of the point cloud data.

In the implementation of this application, the decoder can further parse the bitstream to obtain the recovered data of the point cloud data.

At 204, a position of coordinate data of the point cloud data in a storage unit of the recovered data is determined according to the processing order.

In the implementation of this application, after the decoder determines the processing order of the point cloud data during point cloud decoding according to the coordinate-axis-order index and parses the bitstream to obtain the recovered data of the point cloud data, the decoder can determine the position of the coordinate data of the point cloud data in the storage unit of the recovered data according to the processing order.

That is to say, in this application, the processing order indicates the coordinate axis corresponding to data sequentially output by the decoder after the inverse transform of RAHT (i.e., inverse RAHT) is performed on the recovered data obtained through parsing the bitstream.

Furthermore, in the implementation of this application, when the decoder determines the position of the coordinate data of the point cloud data in the storage unit of the recovered data according to the processing order, the decoder can, in the storage unit of the recovered data, for a point in the point cloud data, obtain coordinate data of the point according to a coordinate axis order indicated by the processing order.

It is understandable that, in this application, when RAHT is performed, based on the processing order of RAHT, the data obtained first is signalled into the data storage unit first, and the data obtained later is signalled into the data storage unit later, that is, the signalling order of the data corresponds to the coordinate axis order.

Specifically, in the implementation of this application, when the decoder determines the position of the coordinate data of the point cloud data in the storage unit of the recovered data according to the processing order, the decoder can perform sequentially, according to the processing order, RAHT on the point cloud data in a corresponding coordinate axis direction.

It should be noted that, in this application, the execution process of RAHT is to: first transform in one coordinate direction, then transform in another coordinate direction, and finally transform in the third coordinate direction.

It should be noted that, in the implementation of this application, when the decoder performs sequentially, according to the processing order, RAHT on the point cloud data in the corresponding coordinate axis direction, the decoder can parse the bitstream to determine a Morton code of a node in the point cloud data and perform RAHT on the point cloud data according to the processing order and the Morton code.

Specifically, in the implementation of this application, the decoder can first calculate to obtain the Morton code of each node in the point cloud data, then sort the nodes in the point cloud data according to an ascending order of the Morton code, and finally traverse each node in the point cloud data in the sorted order.

It can be understood that, in the implementation of this application, the processing order is the transform order when RAHT is performed on the attribute information of the point cloud. Therefore, after the decoder determines the processing order, it can use the processing order to perform RAHT on the point cloud data.

It should be noted that, in the implementation of this application, since the point cloud data may be all data in the point cloud, the processing order may be the transform order of all data in the point cloud. Furthermore, after determining the processing order, the decoder can sequentially perform RAHT on each point in the point cloud according to the processing order.

Furthermore, in the implementation of this application, since the point cloud data may also be part of data in the point cloud, that is, the point cloud data may be data of any slice in the point cloud, the processing order can also be the transform order of part of data in the point cloud. Furthermore, after determining the processing order corresponding to a certain slice in the point cloud, the decoder can sequentially perform RAHT on each point in this slice according to the processing order.

That is to say, in this application, if the processing order is the transform order of all data in the point cloud, the decoder can use the same transform order to perform RAHT on the all data in the point cloud. If the processing order is the transform order of part of data in the point cloud, the decoder can use the same transform order to perform RAHT on the part of data in the point cloud. For example, for data in a slice after partition, the same transform order can be used for RAHT.

Furthermore, in the implementation of this application, when the decoder performs RAHT on the point cloud data according to the processing order and the Morton code, the decoder may first compare the processing order with the preset order, to determine whether the processing order is a same as a preset order.

It can be understood that, in the implementation of this application, the preset order may be a default transform order pre-stored by the decoder. For example, the decoder can set the Z-Y-X order as the preset order.

Furthermore, in the implementation of this application, after the decoder compares the processing order with the preset order, the decoder performs RAHT on the point cloud data directly according to the preset order and the Morton code, if the processing order is the same as the preset order; the decoder performs RAHT on the point cloud data according to the processing order and the Morton code, if the processing order is different from the preset order.

Figure 13:
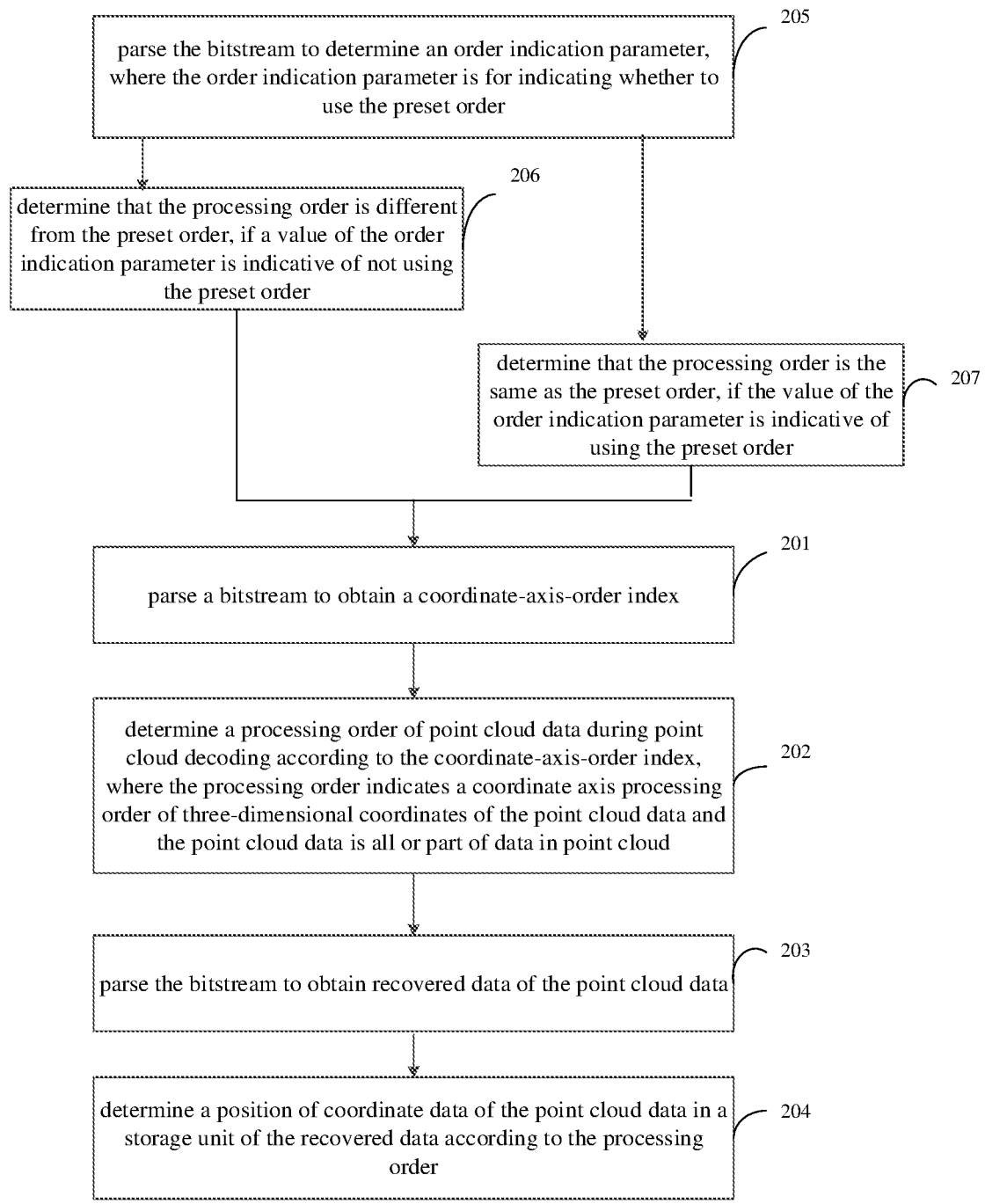
FIG. 13 is schematic diagram 2 of an implementation process of point cloud decoding.

It should be noted that, in implementations of this application, FIG. 13 is schematic diagram 2 of an implementation process of point cloud decoding. As illustrated in FIG. 13, before the decoder parses the bitstream to obtain the coordinate-axis-order index, i.e., before 201, the method performed by the decoder for decoding the point cloud data further includes the following.

At 205, the bitstream is parsed to determine an order indication parameter, where the order indication parameter is for indicating whether to use the preset order.

At 206, determine that the processing order is different from the preset order, if a value of the order indication parameter is indicative of not using the preset order.

At 207, determine that the processing order is the same as the preset order, if the value of the order indication parameter is indicative of using the preset order.

In the implementation of this application, the decoder may first determine the order indication parameter corresponding to the point cloud data by parsing the bitstream, and then determine whether to use the preset order for transform according to the order indication parameter.

It should be noted that, in the implementation of this application, the order indication parameter may be used to indicate whether to use the preset order. That is, if the encoder uses the preset order for transform, the order indication parameter obtained by the decoder through parsing can indicate that the preset order is used. If the encoder does not use the preset order for transform, the order indication parameter obtained by the decoder through parsing can indicate that the preset order is not used.

Furthermore, in the implementation of this application, after the decoder obtains the order indication parameter through parsing, if the value of the order indication parameter indicates that the preset order is not used, the decoder needs to transform the point cloud data according to the processing order; if the value of the order indication parameter indicates that the preset order is used, the decoder can transform the point cloud data according to the preset order.

Exemplarily, in this application, when the value of the order indication parameter is 0, it can be indicated that the preset order is not used; when the value of the order indication parameter is set to 1, it can be indicated that the preset order is used.

It is understandable that, in this application, the order indication parameter can be characterized by the syntax attr_raht_order_default_flag. Specifically, if the value of attr_raht_order_default_flag is equal to 1, it indicates that the preset order is used; if the value of attr_raht_order_default_flag is equal to 0, it indicates that the preset order is not used.

According to the point cloud decoding method proposed in the above steps 201 to 207, the decoder no longer uses the fixed transform order to perform RAHT on the point cloud data, as proposed in the prior art. For example, the X-Y-Z order is used to perform RAHT on all point cloud data. Instead, during decoding the point cloud data, the processing order corresponding to the point cloud data is determined before the transform, and then the processing order is used to perform RAHT.

It can be understood that, in this application, from the perspective of the processing order of the three coordinates of X, Y, and Z, currently, in G-PCC, the decoder performs transform in a fixed order. In contrast, the point cloud decoding method proposed in this application can adaptively change the processing order of the decoder on the three coordinates in G-PCC, thereby improving decoding efficiency.

It should be noted that, in this application, the flexibility of the processing order can be constrained to the sequence layer, and the entire point cloud can use the same coordinate processing order, that is, partitions in the point cloud (such as slices) all use the same coordinate processing order.

It is understandable that, in this application, the encoding end may preprocess the point cloud data before encoding the point cloud data. Specifically, the encoder can reset the X, Y, and Z coordinate axes of the point cloud data and re-determine the processing order. Thereafter, the encoder encodes the preprocessed point cloud data, and from the perspective of display, indicates the preprocessing method at the sequence layer, that is, after encoding the coordinate-axis-order index corresponding to the processing order, the encoder signals the encoded bits into the bitstream. Therefore, after the bitstream is transmitted to the decoding end, the decoder decodes the bitstream to obtain the decoded point cloud, and performs post-processing on the point cloud according to the preprocessing method indicated by the sequence layer. That is, the decoding end parses to obtain the coordinate-axis-order index, and determines the processing order indicated by the coordinate-axis-order index, so that the X, Y, and Z coordinate axes of the point cloud data can be adaptively set.

Implementations of this application provide the point cloud decoding method. The decoder parses the bitstream to obtain the coordinate-axis-order index. The decoder determines the processing order of the point cloud data during point cloud decoding according to the coordinate-axis-order index, where the processing order indicates the coordinate axis processing order of the three-dimensional coordinates of the point cloud data and the point cloud data is all or part of data in the point cloud. The decoder parses the bitstream to obtain the recovered data of the point cloud data. The decoder determines the position of the coordinate data of the point cloud data in the storage unit of the recovered data according to the processing order. That is, in the implementations of this application, at the encoding side, the encoder can first determine the processing order of transform corresponding to the point cloud data, signal the processing order into the bitstream while performing RAHT according to the processing order, and transmit the processing order to the decoder. At the decoding side, the decoder parses the bitstream to obtain the processing order of the transform corresponding to the point cloud data, so that RAHT can be performed according to the processing order. It can be seen, in the point cloud encoding and decoding method provided in this application, for all or part of data in the point cloud, a fixed order is no longer used to perform RAHT, but a syntax element in the bitstream is used to indicate the processing order. In this way, the coordinate processing order during coding can be changed adaptively and the transform efficiency of RAHT can be further fully showed. As such, the problem of low transform efficiency can be solved and the coding efficiency can be greatly improved.

Based on the above implementation, another implementation of this application provides a point cloud encoding and decoding method. Compared with the prior art, in the implementation of this application, the codec can change the fixed transform order, that is, change the default order which is not transmitted. No matter at the encoding end or the decoding end, the processing order corresponding to the point cloud data is determined before RAHT is performed on the point cloud, and then the processing order is used for RAHT. The transform process at the decoding end will be exemplified below.

Exemplarily, in an implementation, the decoder obtains the processing order X-Y-Z of the point cloud data after parsing the bitstream. The point cloud data is part of data in the point cloud, that is, a slice(s) in the point cloud, and the processing order is different from the fixed preset order Z-Y-X. Thereafter, the decoder can sort the points in the corresponding slice based on the Morton code.

In the octree node decoding process, the spatial position of points in each occupied child is determined according to the number of duplicate points in each child and the use of direct coded positions. Refer to the following.

```
for( child = 0; child < GeometryNodeChildrenCnt; child++ ) {
    childIdx = GeometryNodeChildren[ child ];
    x = 2 × xN + ( childIdx & 4 == 1 );
    y = 2 × yN + ( childIdx & 2 == 1 );
    x = 2 × zN + ( childIdx & 1 == 1 );
    for( i = 0; i < GeometryNodeDupPoints[child] + 1 ; i++,
    PointCount++ ) {
      PointPos[PointCount][0] = x;
      PointPos[PointCount][1] = y;
      PointPos[PointCount][2] = z;
    }
}
```

```
    if( direct_mode_flag ) {
      for( i = 0; i <= num_direct_points_minus1; i++,
      PointCount++ ) {
        PointPos[PointCount][0] = x + PointOffsetX[i];
        PointPos[PointCount][1] = y + PointOffsetY[i];
        PointPos[PointCount][2] = z + PointOffsetZ[i];
      }
    }
  }
```

In the point sorting process based on Morton code, the decoder parses the bitstream to obtain the array McodeBeforeSort[i], where i=0 . . . PointNum-1. Refer to the following.

```
for ( b=0; b< raht_depth; b++ ){
    McodeBeforeSort[i] |= ((PointPos[i][1]>>b) & 1) << (3 × b+2)
    McodeBeforeSort[i] |= ((PointPos[i][2]>>b) & 1) << (3 × b+1)
    McodeBeforeSort[i] |= ((PointPos[i][0]>>b) & 1) << (3 × b)
}
```

Generally, from the perspective of the encoding process or the encoder, a syntax element is signalled in the bitstream to indicate information. From the perspective of the decoding process or the decoder, the syntax element is parsed from the bitstream to obtain the indicated information.

Exemplarily, in an implementation, the processing order may be signalled in the attribute parameter set syntax. That is, the decoder can obtain the processing order by parsing the bitstream of the attribute parameter set, where the syntax of the attribute parameter set is illustrated in Table 4.

TABLE 4

| | Descriptor |
|---|---|
| attribute_parameter_set( ) { | |
|     aps_attr_parameter_set_id | ue(v) |
|     aps_seq_parameter_set_id | ue(v) |
|     attr_coding_type | ue(v) |
|     aps_attr_initial_qp | ue(v) |
|     aps_attr_chroma_qp_offset | se(v) |
|     aps_slice_qp_delta_present_flag | u(1) |
|     if( attr_coding_type == 1 ){ | |
|         attr_raht_order_index | u(3) |
|     } | |
|     isLifting = ( attr_coding_type == 0 \|\| attr_coding_type == 2 ) ? 1 : 0 | |
|     if(isLifting) { | |
|         lifting_num_pred_nearest_neighbours | ue(v) |
|         lifting_max_num_direct_predictors | ue(v) |
|         lifting_search_range | ue(v) |
|         lifting_lod_regular_sampling_enabled_flag | u(1) |
|         lifting_num_detail_levels_minus1 | ue(v) |
| [Ed. The V6.0 code use the variable without minus1. It should be aligned] | |
|         for( idx = 0; idx <= num_detail_levels_minus1; idx++ ) { | |
|             if ( lifting_lod_decimation_enabled_flag ) | |
|                 lifting_sampling_period[idx] | ue(v) |
|             else | |
|                 lifting_sampling_distance_squared[idx] | ue(v) |
|         } | |
|     } | |
|     if( attr_coding_type == 0 ) | |
|         lifting_adaptive_prediction_threshold | ue(v) |
|         lifting_intra_lod_prediction_num_layers | ue(v) |
|     } | |

TABLE 4-continued

| | Descriptor |
|---|---|
| aps_extension_present_flag | u(1) |
| if( aps_extension_present_flag ) | |
|     while( more_data_in_byte_stream( ) ) | |
|         aps_extension_data_flag | u(1) |
|     byte_alignment( ) | |
| } | |

Specifically, in this application, the coordinate-axis-order index attr_raht_order_index may indicate the processing order for the node, that is, the transform order of RAHT. In the bitstream, the value of attr_raht_order_index can be 0, 1, 2, 3, 4, 5, 6, or 7. Based on the above Table 1, the decoder can determine the corresponding processing order based on attr_raht_order_index obtained through parsing. Thereafter, according to the processing order, the point sorting process based on Morton code can be performed.

Exemplarily, in an implantation, in the attribute parameter set, a flag may be first signalled to indicate whether to use the default transform order, that is, whether to use the preset order. If the preset order is not used, the coordinate-axis-order index attr_raht_order_index is signalled to indicate the transform order other than the preset order.

That is to say, in this application, the decoder can obtain the order indication parameter after parsing the bitstream of the attribute parameter set. The order indication parameter is used to indicate whether to use the preset order. The attribute parameter set syntax is illustrated in Table 5.

TABLE 5

| | Descriptor |
|---|---|
| attribute_parameter_set( ) { | |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   if( attr_coding_type == 1 ){ | |
|     attr_raht_order_default_flag | u(1) |
|     if(attr_raht_order_default_flag == 0 ){ | |
|       attr_raht_order_index | u(3) |
|     } | |
|   } | |
|   isLifting = ( attr_coding_type == 0 \|\| attr_coding_type == 2) ? 1 : 0 | |
|   if(isLifting) { | |
|     lifting_num_pred_nearest_neighbours | ue(v) |
|     lifting_max_num_direct_predictors | ue(v) |
|     lifting_search_range | ue(v) |
|     lifting_lod_regular_sampling_enabled_flag | u(1) |
|     lifting_num_detail_levels_minus1 | ue(v) |
| [Ed. The V6.0 code use the variable without minus1. It should be aligned] | |
|     for( idx = 0; idx <= num_detail_levels_minus1; idx++ ) { | |
|       if ( lifting_lod_decimation_enabled_flag ) | |
|         lifting_sampling_period[idx] | ue(v) |
|       else | |
|         lifting_sampling_distance_squared[idx] | ue(v) |
|     } | |
|   } | |
|   if( attr_coding_type == 0 ) | |
|     lifting_adaptive_prediction_threshold | ue(v) |
|     lifting_intra_lod_prediction_num_layers | ue(v) |
|   } | |

TABLE 5-continued

| | Descriptor |
|---|---|
| aps_extension_present_flag | u(1) |
| if( aps_extension_present_flag ) | |
|     while( more_data_in_byte_stream( ) ) | |
|         aps_extension_data_flag | u(1) |
|   byte_alignment( ) | |
| } | |

It is understandable that, in this application, the order indication parameter can be characterized by the syntax attr_raht_order_default_flag. Specifically, if the value of attr_raht_order_default_flag is equal to 1, it indicates that the preset order is used. If the value of attr_raht_order_default_flag is equal to 0, it indicates that the preset order is not used.

Furthermore, in the implementation of this application, if the value of attr_raht_order_default_flag is equal to 0, that is, the preset order is not used, the decoder can further determine the processing order used according to the coordinate-axis-order index attr_raht_order_index obtained through parsing.

It is understandable that, in this application, if the preset order is the X-Y-Z order, the value of the coordinate-axis-order index attr_raht_order_index obtained by the decoder through parsing can be used to indicate the other five transform orders except for the X-Y-Z order. That is, in this application, on the basis of determining the order indication parameter attr_raht_order_default_flag, the coordinate-axis-order index attr_raht_order_index is used to indicate other transform orders except for the preset order.

TABLE 6

| coordinate-axis-order index | processing order |
|---|---|
| 0 | Z-Y-X |
| 1 | X-Z-Y |
| 2 | Y-Z-X |
| 3 | Z-X-Y |
| 4 | Y-X-Z |

Furthermore, in this application, the coordinate-axis-order index attr_raht_order_index indicates the order of RAHT (except for the default preset order) for the node, that is, indicates the processing order. In the bitstream, the value of attr_raht_order_index can be equal to 0, 1, 2, 3 or 4. Table 6 is a correspondence table 3 between preset indexes and processing orders, where the preset order is X-Y-Z. As illustrated in Table 6, based on the value of coordinate-axis-order index, the decoder can determine the corresponding processing order by querying the correspondence table between the preset indexes and the processing orders.

Furthermore, in this application, after the decoder obtains the order indication parameter attr_raht_order_default_flag by parsing the bitstream of the attribute parameter set, if the value of attr_raht_order_default_flag is equal to 1, it indicates that the preset order is used. Then, according to the preset order, the decoder can perform the point sorting process based on Morton code.

Furthermore, in this application, after the decoder obtains the order indication parameter attr_raht_order_default_flag by parsing the bitstream of the attribute parameter set, if the value of attr_raht_order_default_flag is equal to 0, it indicates that the preset order is not used. Then, the decoder can continue to parse the bitstream to obtain the coordinate-axis-order index attr_raht_order_index, and determine the processing order. Thus, according to the processing order, the point sorting process based on Morton code can be performed.

Exemplarily, in an implementation, the processing order is signalled in the attribute parameter set, except that the descriptor of the syntax element attr_raht_order_index is ue(V) (i.e., Exp-Golomb codes). From the perspective of encoding, the descriptor corresponds to the entropy coding method of the syntax element, while from the perspective of decoding, the descriptor corresponds to the parsing process of the syntax element.

It is understandable that, in this application, the processing order of RAHT is signalled in the attribute parameter set, which will be applied in encoding or decoding one or more slices referring to this attribute parameter set.

Exemplarily, in an implementation, the processing order with or without the preset order is signalled in the attribute slice header. The attribute slice header syntax is illustrated in Table 7.

TABLE 7

| | Descriptor |
|---|---|
| attribute_slice_header( ) { | |
|   ash_attr_parameter_set_id | ue(v) |
|   ash_attr_sps_attr_idx | ue(v) |
|   ash_attr_geom_slice_id | ue(v) |
|   if( attr_coding_type == 1 ){ | |
|     ... | |
|   } | |
|   if (aps_slice_qp_delta_present_flag) { | |
|     ash_qp_delta_luma | se(v) |
|     ash_qp_delta_chroma | se(v) |
|   } | |
|   byte_alignment( ) | |
| } | |

It can be understood that, in this application, the processing order signalled in the attribute slice header is only used to encode or decode this slice.

Exemplarily, in an implementation, the processing order with/without the preset order is signalled in the attribute parameter set and the attribute slice header referring to this attribute parameter set. The processing order signalled in the attribute slice header can override the processing order determined by parsing the attribute parameter set.

Specifically, in this application, the processing order is signalled in the attribute parameter set, where the attribute parameter set syntax is illustrated in Table 8.

TABLE 8

| | Descriptor |
|---|---|
| attribute_parameter_set( ) { | |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   if( attr_coding_type == 1 ){ | |
|     ... | |
|   } | |
|   isLifting = ( attr_coding_type == 0 \|\| attr_coding_type == 2) ? 1 : 0 | |
|   if(isLifting) { | |
|     lifting_num_pred_nearest_neighbours | ue(v) |
|     lifting_max_num_direct_predictors | ue(v) |
|     lifting_search_range | ue(v) |
|     lifting_lod_regular_sampling_enabled_flag | u(1) |
|     lifting_num_detail_levels_minus1 | ue(v) |

TABLE 8-continued

| | Descriptor |
|---|---|
| [Ed. The V6.0 code use the variable without minus1. It should be aligned] | |
|     for( idx = 0; idx <= num_detail_levels_minus1; idx++ ) { | |
|       if ( lifting_lod_decimation_enabled_flag ) | |
|         lifting_sampling_period[idx] | ue(v) |
|       else | |
|         lifting_sampling_distance_squared[ idx ] | ue(v) |
|     } | |
|   } | |
|   if( attr_coding_type == 0 ) | |
|     lifting_adaptive_prediction_threshold | ue(v) |
|     lifting_intra_lod_prediction_num_layers | ue(v) |
|   } | |
|   aps_extension_present_flag | u(1) |
|   if( aps_extension_present_flag ) | |
|     while( more_data_in_byte_stream( ) ) | |
|       aps_extension_data_flag | u(1) |
|   byte_alignment( ) | |
| } | |

Furthermore, in the implementation of this application, the attribute slice header syntax is illustrated in Table 9.

TABLE 9

| | Descriptor |
|---|---|
| attribute_slice_header( ) { | |
|   ash_attr_parameter_set_id | ue(v) |
|   ash_attr_sps_attr_idx | ue(v) |
|   ash_attr_geom_slice_id | ue(v) |
|   if( attr_coding_type == 1 ){ | |
|     ash_attr_raht_order_override_flag | u(1) |
|     if(ash_attr_raht_order_override_flag == 1 ) | |
|       ash_attr_raht_order_index | u(3) (or ue(v)) |
|   } | |
|   if (aps_slice_qp_delta_present_flag) { | |
|     ash_qp_delta_luma | se(v) |
|     ash_qp_delta_chroma | se(v) |
|   } | |
|   byte_alignment( ) | |
| } | |

It is understandable that, in this application, the decoder can obtain the syntax element ash_attr_raht_order_override_flag after parsing the bitstream. The syntax element ash_attr_raht_order_override_flag is used to indicate whether to use the processing order signalled in the attribute parameter set.

Furthermore, in the implementation of this application, if the value of ash_attr_raht_order_override_flag is equal to 0, the processing order signalled in the attribute parameter set referred to by the slice is used.

Furthermore, in the implementation of this application, if the value of ash_attr_raht_order_override_flag is equal to 1, it indicates that the processing order indicated by ash_attr_raht_index is used. Then, the decoder can obtain ash_attr_raht_index through parsing, to further determine the processing order used. Specifically, the decoder may further obtain the processing order indicated by ash_attr_raht_index through the above Table 1.

It can be understood that, in the implementation of this application, if the value of ash_attr_raht_order_override_flag is equal to 1, it indicates that the processing order indicated by ash_attr_raht_index is used. Then, the decoder can dynamically determine it by removing the processing order already signalled in the attribute parameter set (that is, the active attribute parameter set) referring to the slice. For example, if the processing order signalled in the active attribute parameter set is Z-Y-X, the encoder or decoder can construct a correspondence table between preset indexes and processing orders by using orders other than the Z-Y-X order. In the bitstream, the value of attr_raht_order_index can be equal to 0, 1, 2, 3 or 4. Table 10 illustrates a correspondence table 4 between preset indexes and processing orders. If the processing order signalled in the active attribute parameter set is Z-Y-X, as illustrated in Table 10, based on the value of coordinate-axis-order indexash_attr_raht_index, the decoder can determine the corresponding processing order by querying the correspondence table between the preset indexes and the processing orders.

TABLE 10

| coordinate-axis-order index | processing order |
|---|---|
| 0 | X-Y-Z |
| 1 | X-Z-Y |
| 2 | Y-Z-X |
| 3 | Z-X-Y |
| 4 | Y-X-Z |

It is understandable that, in this application, if ash_attr_raht_order_index is ue(v) coded or parsed, the bits used to represent ash_attr_raht_order_index in the bitstream can be saved.

Furthermore, in this application, when attr_coding_type is equal to 1 in the attribute parameter set, the additional flag such as attr_raht_order_override_allowed_flag is signalled (from the perspective of the encoding or encoder) or parsed (from the perspective of the decoding or decoder), to indicate whether the processing order of RAHT specified in the attribute slice header referring to the attribute parameter set is allowed to override the processing order of RAHT specified in the attribute parameter set. For attr_raht_order_override_allowed_flag, the attribute slice header syntax is illustrated in Table 11.

TABLE 11

| | Descriptor |
|---|---|
| attribute_slice_header( ) { | |
|     ash_attr_parameter_set_id | ue(v) |
|     ash_attr_sps_attr_idx | ue(v) |
|     ash_attr_geom_slice_id | ue(v) |
|     if( attr_coding_type == 1 && | |
| attr_raht_order_override_allowed_flag == 1){ | |
|         ash_attr_raht_order_override_flag | u(1) |
|         if(ash_attr_raht_order_override_flag == 1 ) | |
|             ash_attr_raht_order_index | u(3) (or ue(v)) |
|     } | |
|     if (aps_slice_qp_delta_present_flag) { | |
|         ash_qp_delta_luma | se(v) |
|         ash_qp_delta_chroma | se(v) |
|     } | |
|     byte_alignment( ) | |
| } | |

Furthermore, in this application, after the decoder parses the bitstream to obtain the processing order, the decoder can execute the Morton code-based point sorting process according to the preset order.

Implementations of this application provide the point cloud encoding and decoding method, the encoder, the decoder, and the computer storage medium. The encoder determines the processing order of point cloud data during point cloud encoding, where the processing order indicates the coordinate axis processing order of the three-dimensional coordinates of the point cloud data and the point cloud data is all or part of data in the point cloud. The encoder determines the coordinate-axis-order index corresponding to the processing order. The encoder encodes the coordinate-axis-order index and signals the encoded bits into the bitstream. The encoder processes the point cloud data according to the processing order, to obtain the point cloud data to-be-encoded. The encoder encodes the point cloud data to-be-encoded and signals the encoded bits into the bitstream. The decoder parses the bitstream to obtain the coordinate-axis-order index. The decoder determines the processing order of the point cloud data during point cloud decoding according to the coordinate-axis-order index, where the processing order indicates the coordinate axis processing order of the three-dimensional coordinates of the point cloud data and the point cloud data is all or part of data in the point cloud. The decoder parses the bitstream to obtain the recovered data of the point cloud data. The decoder determines the position of the coordinate data of the point cloud data in the storage unit of the recovered data according to the processing order. That is, in the implementations of this application, at the encoding side, the encoder can first determine the processing order of transform corresponding to the point cloud data, signal the processing order into the bitstream while performing RAHT according to the processing order, and transmit the processing order to the decoder. At the decoding side, the decoder parses the bitstream to obtain the processing order of the transform corresponding to the point cloud data, so that RAHT can be performed according to the processing order. It can be seen, in the point cloud encoding and decoding method provided in this application, for all or part of data in the point cloud, a fixed order is no longer used to perform RAHT, but a syntax element in the bitstream is used to indicate the processing order. In this way, the coordinate processing order during coding can be changed adaptively and the transform efficiency of RAHT can be further fully showed. As such, the problem of low transform efficiency can be solved and the coding efficiency can be greatly improved.

Figure 14:
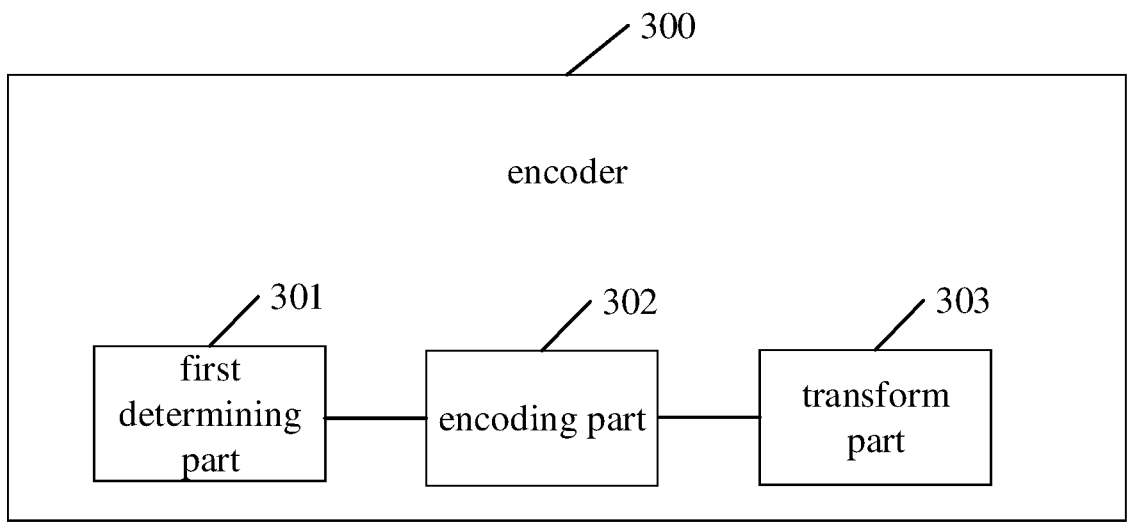
FIG. 14 is schematic diagram 1 of a structure of an encoder.

Based on the above implementations, in still another implementation of this application, FIG. 14 is schematic diagram 1 of a structure of an encoder. As illustrated in FIG. 14, an encoder 300 provided in the implementation of this application includes a first determining part 301, an encoding part 302, and a transform part 303.

The first determining part 301 is configured to determine a processing order of point cloud data during point cloud encoding, where the processing order indicates a coordinate axis processing order of three-dimensional coordinates of the point cloud data and the point cloud data is all or part of data in point cloud, and to determine a coordinate-axis-order index corresponding to the processing order.

The encoding part 302 is configured to encode the coordinate-axis-order index and signal encoded bits into a bitstream.

The transform part 303 is configured to process the point cloud data according to the processing order, to obtain point cloud data to-be-encoded.

The encoding part 302 is further configured to encode the point cloud data to-be-encoded and signal encoded bits into the bitstream.

Furthermore, in an implementation of this application, the first determining part 301 is configured to determine the processing order according to a Morton code of a node in the point cloud data.

Furthermore, in an implementation of this application, the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

Furthermore, in an implementation of this application, the first determining part 301 is further configured to set a value of the coordinate-axis-order index corresponding to the processing order according to a correspondence table between preset indexes and processing orders.

Furthermore, in an implementation of this application, the correspondence table between the preset indexes and the processing orders includes:

| coordinate-axis-order index | processing order |
|---|---|
| 0 | Z-Y-X order |
| 1 | X-Y-Z order |
| 2 | X-Z-Y order |
| 3 | Y-Z-X order |
| 4 | Z-Y-X order |
| 5 | Z-X-Y order |
| 6 | Y-X-Z order |
| 7 | X-Y-Z order. |

Furthermore, in an implementation of this application, the encoding part 302 is configured to encode the coordinate-axis-order index by using fixed length coding.

Furthermore, in an implementation of this application, the encoding part 302 is further configured to signal the encoded bits into a bitstream corresponding to a data unit of a parameter set, where the data unit of the parameter set contains parameters used for decoding the point cloud data Furthermore, in an implementation of this application, the parameter set is a sequence-layer parameter set.

Furthermore, in an implementation of this application, the parameter set is a sequence parameter set.

Furthermore, in an implementation of this application, the data unit of the parameter set contains attribute information of the point cloud data, and the attribute information is a scalar attribute or a vector attribute associated with a point in the point cloud data.

Furthermore, in an implementation of this application, the data unit of the parameter set contains geometry information of the point cloud data, and the geometry information is Cartesian coordinates associated with a point in the point cloud data.

Furthermore, in an implementation of this application, the transform part 303 is configured to perform coordinate mapping on the point cloud data according to the processing order.

Furthermore, in an implementation of this application, the transform part 303 is further configured to rearrange the coordinates of the point cloud data according to the processing order.

Furthermore, in an implementation of this application, the transform part 303 is further configured to process sequentially, according to the processing order, the point cloud data in a corresponding coordinate axis direction.

Furthermore, in an implementation of this application, the transform part 303 is further configured to perform sequentially, according to the processing order, region adaptive hierarchical transform (RAHT) on the point cloud data in the corresponding coordinate axis direction.

Furthermore, in an implementation of this application, the transform part 303 is further configured to determine a Morton code of a node in the point cloud data, and perform RAHT on the point cloud data according to the processing order and the Morton code.

Furthermore, in an implementation of this application, the transform part 303 is further configured to perform RAHT on the point cloud data according to a preset order and the Morton code, if the processing order is a same as the preset order, and perform RAHT on the point cloud data according to the processing order and the Morton code, if the processing order is different from the preset order.

Furthermore, in an implementation of this application, the first determining part 301 is further configured to determine an order indication parameter according to the processing order, where the order indication parameter is for indicating whether to use the preset order, after determining the processing order of the point cloud data during point cloud encoding and before determining the coordinate-axis-order index corresponding to the processing order. The encoding part 302 is further configured to encode the order indication parameter and signal encoded bits into the bitstream.

Furthermore, in an implementation of this application, the first determining part 301 is further configured to set a value of the order indication parameter to be indicative of not using the preset order, if the processing order is different from the preset order, and set the value of the order indication parameter to be indicative of using the preset order, if the processing order is the same as the preset order.

Furthermore, in an implementation of this application, the encoding part 302 is further configured to signal the encoded bits into a data unit where auxiliary information of the bitstream is located.

Furthermore, in an implementation of this application, the auxiliary information is VUI.

Furthermore, in an implementation of this application, the auxiliary information is SEI.

Furthermore, in an implementation of this application, the encoding part 302 is further configured to signal the encoded bits into a transmission stream containing point cloud encoding data corresponding to the point cloud data.

Furthermore, in an implementation of this application, the encoding part 302 is further configured to signal the encoded bits into a media file containing point cloud encoding data corresponding to the point cloud data.

Figure 15:
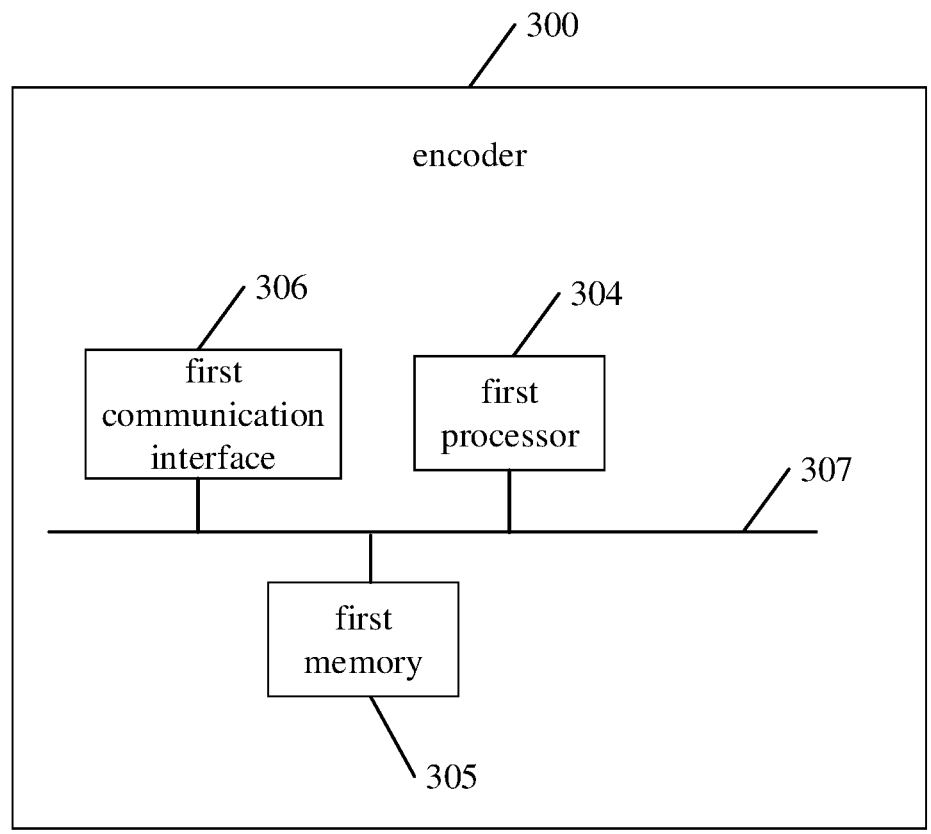
FIG. 15 is schematic diagram 2 of a structure of an encoder.

FIG. 15 is schematic diagram 2 of a structure of an encoder. As illustrated in FIG. 15, the encoder 300 provided in the implementation of this application can further include a first processor 304, a first memory 305 storing instructions executable by the first processor 304, a first communication interface 306, and a first bus 307 for connecting the first processor 304, the first memory 305, and the first communication interface 306.

Furthermore, in the implementation of this application, the above first processor 304 is configured to determine a processing order of point cloud data during point cloud encoding, where the processing order indicates a coordinate axis processing order of three-dimensional coordinates of the point cloud data and the point cloud data is all or part of data in point cloud; determine a coordinate-axis-order index corresponding to the processing order; encode the coordinate-axis-order index and signal encoded bits into a bitstream; process the point cloud data according to the processing order, to obtain point cloud data to-be-encoded; and encode the point cloud data to-be-encoded and signal encoded bits into the bitstream.

If the integrated units are implemented as software functional units and sold or used as standalone products, they may be stored in a computer readable storage medium.

Based on such an understanding, the essential technical solution, or the portion that contributes to the prior art, or all or part of the technical solution of this application may be embodied as software products. The computer software products can be stored in a storage medium and may include multiple instructions that, when executed, can cause a computing device, e.g., a personal computer, a server, a network device, etc., or a processor to execute some or all operations of the methods described in various implementations. The above storage medium may include various kinds of media that can store program codes, such as a universal serial bus (USB) flash disk, a mobile hard drive, a read only memory (ROM), a random access memory (RAM), a magnetic disk, or an optical disk.

Implementations of this application provide the encoder. The encoder determines the processing order of point cloud data during point cloud encoding, where the processing order indicates the coordinate axis processing order of the three-dimensional coordinates of the point cloud data and the point cloud data is all or part of data in the point cloud. The encoder determines the coordinate-axis-order index corresponding to the processing order. The encoder encodes the coordinate-axis-order index and signals the encoded bits into the bitstream. The encoder processes the point cloud data according to the processing order, to obtain the point cloud data to-be-encoded. The encoder encodes the point cloud data to-be-encoded and signals the encoded bits into the bitstream. That is, in the implementations of this application, at the encoding side, the encoder can first determine the processing order of transform corresponding to the point cloud data, signal the processing order into the bitstream while performing RAHT according to the processing order, and transmit the processing order to the decoder. At the decoding side, the decoder parses the bitstream to obtain the processing order of the transform corresponding to the point cloud data, so that RAHT can be performed according to the processing order. It can be seen, in the point cloud encoding and decoding method provided in this application, for all or part of data in the point cloud, a fixed order is no longer used to perform RAHT, but a syntax element in the bitstream is used to indicate the processing order. In this way, the coordinate processing order during coding can be changed adaptively and the transform efficiency of RAHT can be further fully showed. As such, the problem of low transform efficiency can be solved and the coding efficiency can be greatly improved.

Figure 16:
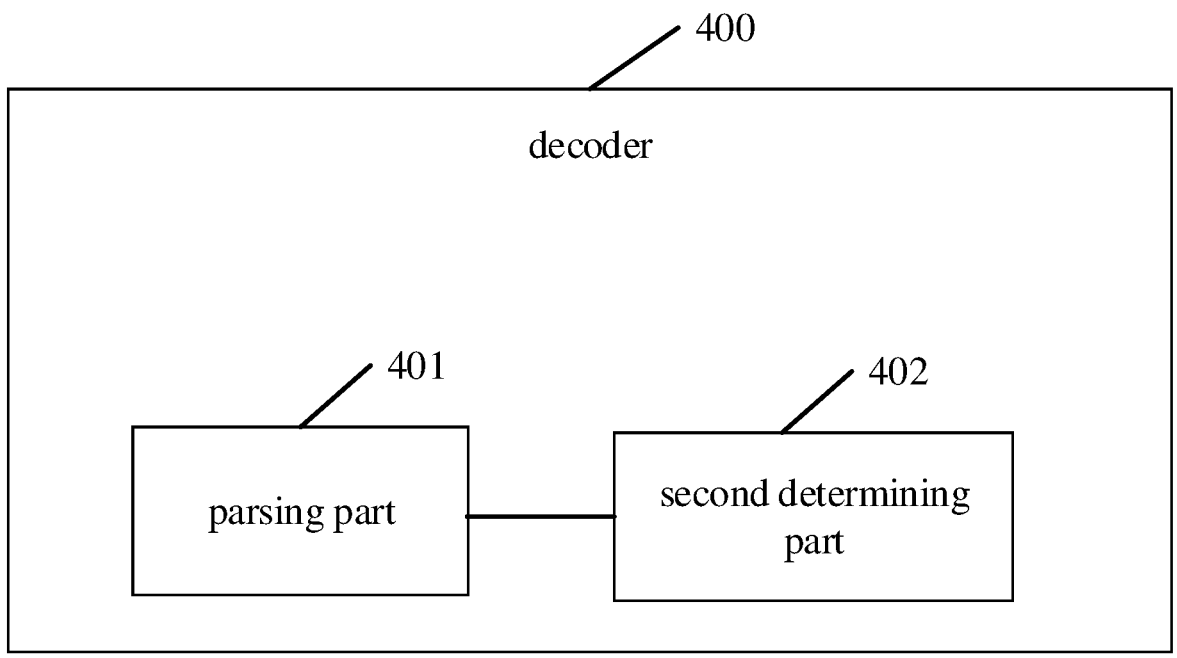
FIG. 16 is schematic diagram 1 of a structure of a decoder.

FIG. 16 is schematic diagram 1 of a structure of a decoder. As illustrated in FIG. 16, a decoder 400 provided in the implementation of this application includes a parsing part 401 and a second determining part 402.

The parsing part 401 is configured to parse a bitstream to obtain a coordinate-axis-order index.

The second determining part 402 is configured to determine a processing order of point cloud data during point cloud decoding according to the coordinate-axis-order index, where the processing order indicates a coordinate axis processing order of three-dimensional coordinates of the point cloud data and the point cloud data is all or part of data in point cloud.

The parsing part 401 is further configured to parse the bitstream to obtain recovered data of the point cloud data.

The second determining part 402 is further configured to determine a position of coordinate data of the point cloud data in a storage unit of the recovered data according to the processing order.

Furthermore, in the implementation of this application, the parsing part 401 is configured to parse a fixed length code to obtain the coordinate-axis-order index.

Furthermore, in the implementation of this application, the parsing part 401 is further configured to parse a bitstream corresponding to a data unit of a parameter set in the bitstream, where the data unit of the parameter set contains parameters used for decoding the point cloud data.

Furthermore, in the implementation of this application, the parameter set is a sequence-layer parameter set.

Furthermore, in the implementation of this application, the parameter set is a sequence parameter set.

Furthermore, in the implementation of this application, the data unit of the parameter set contains attribute information of the point cloud data, and the attribute information is a scalar attribute or a vector attribute associated with a point in the point cloud data.

Furthermore, in the implementation of this application, the data unit of the parameter set contains geometry information of the point cloud data, and the geometry information is Cartesian coordinates associated with a point in the point cloud data.

Furthermore, in the implementation of this application, the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

Furthermore, in the implementation of this application, the second determining part 402 is configured to determine the processing order corresponding to the coordinate-axis-order index according to a correspondence table between preset indexes and processing orders.

Furthermore, in the implementation of this application, the correspondence table between the preset indexes and the processing orders includes:

| coordinate-axis-order index | processing order |
| --- | --- |
| 0 | Z-Y-X order |
| 1 | X-Y-Z order |
| 2 | X-Z-Y order |
| 3 | Y-Z-X order |
| 4 | Z-Y-X order |
| 5 | Z-X-Y order |
| 6 | Y-X-Z order |
| 7 | X-Y-Z order. |

Furthermore, in the implementation of this application, the second determining part 402 is further configured to, in the storage unit of the recovered data, for a point in the point cloud data, obtain coordinate data of the point according to a coordinate axis order indicated by the processing order.

Furthermore, in the implementation of this application, the second determining part 402 is further configured to perform sequentially, according to the processing order, region adaptive hierarchical transform (RAHT) on the point cloud data in a corresponding coordinate axis direction.

Furthermore, in the implementation of this application, the second determining part 402 is further configured to parse the bitstream to determine a Morton code of a node in the point cloud data, and perform RAHT on the point cloud data according to the processing order and the Morton code.

Furthermore, in the implementation of this application, the second determining part 402 is further configured to perform RAHT on the point cloud data according to a preset order and the Morton code, if the processing order is a same as the preset order, and performing RAHT on the point cloud data according to the processing order and the Morton code, if the processing order is different from the preset order.

Furthermore, in the implementation of this application, the parsing part 401 is further configured to parse the bitstream to determine an order indication parameter, where the order indication parameter is for indicating whether to use the preset order, before parsing the bitstream to obtain the coordinate-axis-order index.

The second determining part 402 is further configured to determine that the processing order is different from the preset order, if a value of the order indication parameter is indicative of not using the preset order, and determine that the processing order is the same as the preset order, if the value of the order indication parameter is indicative of using the preset order.

Furthermore, in the implementation of this application, the parsing part 401 is further configured to parse a data unit where auxiliary information of the bitstream is located, to obtain the coordinate-axis-order index.

Furthermore, in the implementation of this application, the auxiliary information is VUI.

Furthermore, in the implementation of this application, the auxiliary information is SEI.

Furthermore, in the implementation of this application, the parsing part 401 is further configured to parse a transmission stream containing point cloud encoding data, to obtain the coordinate-axis-order index.

Furthermore, in the implementation of this application, the parsing part 401 is further configured to parse a media file containing point cloud encoding data, to obtain the coordinate-axis-order index.

Figure 17:
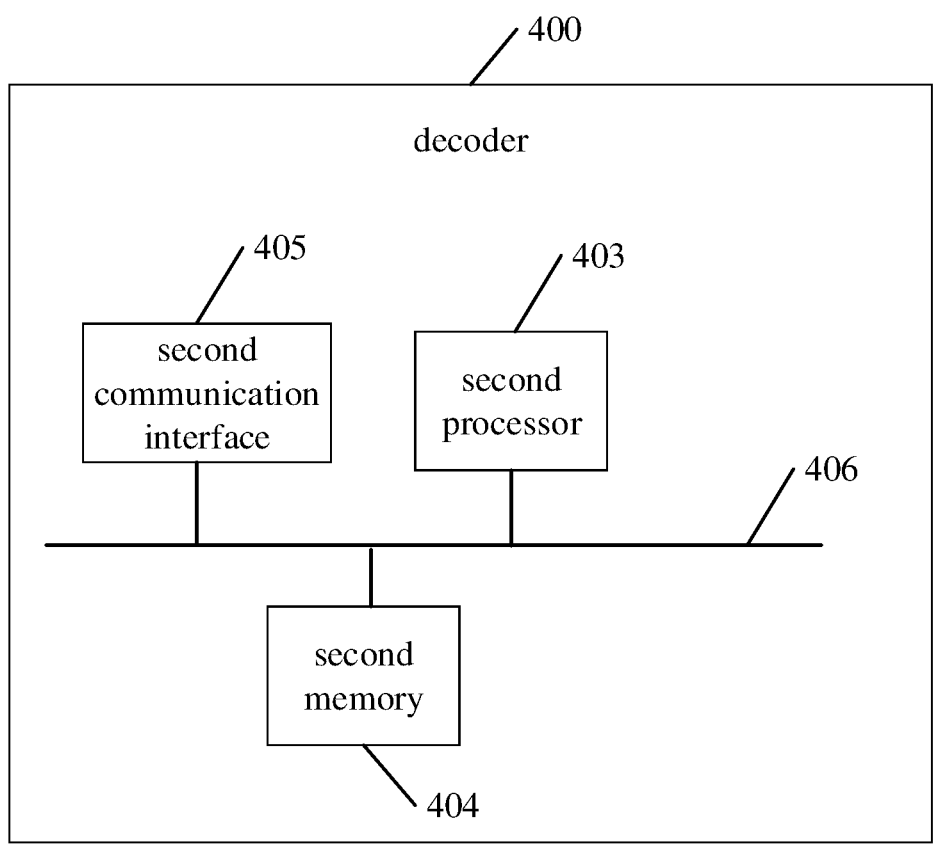
FIG. 17 is schematic diagram 2 of a structure of a decoder.

FIG. 17 is schematic diagram 2 of a structure of a decoder. As illustrated in FIG. 17, the decoder 400 of the implementation of this application can further includes 400 may also include a second processor 403, a second memory 404 storing executable instructions of the second processor 403, a second communication interface 405, and a second bus 406 for connecting the second processor 403, the second memory 404, and the second communication interface 405.

Furthermore, in the implementation of this application, the above second processor 403 is configured to parse a bitstream to obtain a coordinate-axis-order index, determine a processing order of point cloud data during point cloud decoding according to the coordinate-axis-order index, where the processing order indicates a coordinate axis processing order of three-dimensional coordinates of the point cloud data and the point cloud data is all or part of data in point cloud, parse the bitstream to obtain recovered data of the point cloud data, and determine a position of coordinate data of the point cloud data in a storage unit of the recovered data according to the processing order.

If the integrated units are implemented as software functional units and sold or used as standalone products, they may be stored in a computer readable storage medium. Based on such an understanding, the essential technical solution, or the portion that contributes to the prior art, or all or part of the technical solution of this application may be embodied as software products. The computer software products can be stored in a storage medium and may include multiple instructions that, when executed, can cause a computing device, e.g., a personal computer, a server, a network device, etc., or a processor to execute some or all operations of the methods described in various implementations. The above storage medium may include various kinds of media that can store program codes, such as a USB flash disk, a mobile hard drive, a ROM, a RAM, a magnetic disk, or an optical disk.

Implementations of this application provide the decoder. The decoder parses the bitstream to obtain the coordinate-axis-order index. The decoder determines the processing order of the point cloud data during point cloud decoding according to the coordinate-axis-order index, where the processing order indicates the coordinate axis processing order of the three-dimensional coordinates of the point cloud data and the point cloud data is all or part of data in the point cloud. The decoder parses the bitstream to obtain the recovered data of the point cloud data. The decoder determines the position of the coordinate data of the point cloud data in the storage unit of the recovered data according to the processing order. That is, in the implementations of this application, at the encoding side, the encoder can first determine the processing order of transform corresponding to the point cloud data, signal the processing order into the bitstream while performing RAHT according to the processing order, and transmit the processing order to the decoder. At the decoding side, the decoder parses the bitstream to obtain the processing order of the transform corresponding to the point cloud data, so that RAHT can be performed according to the processing order. It can be seen, in the point cloud encoding and decoding method provided in this application, for all or part of data in the point cloud, a fixed order is no longer used to perform RAHT, but a syntax element in the bitstream is used to indicate the processing order. In this way, the coordinate processing order during coding can be changed adaptively and the transform efficiency of RAHT can be further fully showed. As such, the problem of low transform efficiency can be solved and the coding efficiency can be greatly improved.

Implementations of this application provide a computer readable storage medium. The computer readable storage medium stores a program. When executed by a processor, the program implements the method of the above implementations.

Specifically, program instructions corresponding to an encoding method in this implementation can be stored in a storage medium such as an optical disk, a hard disk, and a USB flash disk. When the program instructions corresponding to the encoding method in the storage medium are read or executed by an electronic device, the following operations are implemented.

A processing order of point cloud data during point cloud encoding is determined, where the processing order indicates a coordinate axis processing order of three-dimensional coordinates of the point cloud data and the point cloud data is all or part of data in point cloud. A coordinate-axis-order index corresponding to the processing order is determined. The coordinate-axis-order index is encoded and encoded bits are signalled into a bitstream. The point cloud data is processed according to the processing order, to obtain point cloud data to-be-encoded. The point cloud data to-be-encoded is encoded and encoded bits are signalled into the bitstream.

Specifically, program instructions corresponding to a decoding method in this implementation can be stored in a storage medium such as an optical disk, a hard disk, and a USB flash disk. When the program instructions corresponding to the decoding method in the storage medium are read or executed by an electronic device, the following operations are implemented.

A bitstream is parsed to obtain a coordinate-axis-order index. A processing order of point cloud data during point cloud decoding is determined according to the coordinate-axis-order index, where the processing order indicates a coordinate axis processing order of three-dimensional coordinates of the point cloud data and the point cloud data is all or part of data in point cloud. The bitstream is parsed to obtain recovered data of the point cloud data. A position of coordinate data of the point cloud data in a storage unit of the recovered data is determined according to the processing order.

Those skilled in the art will understand that implementations herein can provide a method, a system, or a computer program product. Therefore, this application may have hardware-only implementations, software-only implementations, or software plus hardware implementations. In addition, this application may be implemented in the form of a computer program product embodied on one or more computer usable storage media (including but not limited to a magnetic storage device, an optical memory, and the like) including computer usable program codes.

This application is described herein with reference to schematic flowcharts and/or block diagrams of methods, apparatuses (systems), and computer program products according to the implementations of this application. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatuses to form a machine, such that devices for implementing functions specified by one or more flows in the flowchart and/or one or more blocks in the block diagram may be generated by executing the instructions with the processor of the computer or other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flowchart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flowchart and/or one or more blocks in the block diagram.

The above are only preferred implementations of this application, and are not used to limit the protection scope of this application.

INDUSTRIAL APPLICABILITY

Implementations of this application provide a point cloud encoding and decoding method, an encoder, a decoder, and a computer storage medium. The encoder determines the processing order of point cloud data during point cloud encoding, where the processing order indicates the coordinate axis processing order of the three-dimensional coordinates of the point cloud data and the point cloud data is all or part of data in the point cloud. The encoder determines the coordinate-axis-order index corresponding to the processing order. The encoder encodes the coordinate-axis-order index and signals the encoded bits into the bitstream. The encoder processes the point cloud data according to the processing order, to obtain the point cloud data to-be-encoded. The encoder encodes the point cloud data to-be-encoded and signals the encoded bits into the bitstream. The decoder parses the bitstream to obtain the coordinate-axis-order index. The decoder determines the processing order of the point cloud data during point cloud decoding according to the coordinate-axis-order index, where the processing order indicates the coordinate axis processing order of the three-dimensional coordinates of the point cloud data and the point cloud data is all or part of data in the point cloud. The decoder parses the bitstream to obtain the recovered data of the point cloud data. The decoder determines the position of the coordinate data of the point cloud data in the storage unit of the recovered data according to the processing order. That is, in the implementations of this application, at the encoding side, the encoder can first determine the processing order of transform corresponding to the point cloud data, signal the processing order into the bitstream while performing RAHT according to the processing order, and transmit the processing order to the decoder. At the decoding side, the decoder parses the bitstream to obtain the processing order of the transform corresponding to the point cloud data, so that RAHT can be performed according to the processing order. It can be seen, in the point cloud encoding and decoding method provided in this application, for all or part of data in the point cloud, a fixed order is no longer used to perform RAHT, but a syntax element in the bitstream is used to indicate the processing order. In this way, the coordinate processing order during coding can be changed adaptively and the transform efficiency of RAHT can be further fully exhibited. As such, the problem of low transform efficiency can be solved and the coding efficiency can be greatly improved.

What is claimed is:

1. A point cloud encoding method, implemented in an encoder and comprising:
    determining a processing order of point cloud data during point cloud encoding, the processing order indicating a coordinate axis processing order of three-dimensional coordinates of the point cloud data and the point cloud data being all or part of data in point cloud;
    determining a coordinate-axis-order index corresponding to the processing order wherein the coordinate-axis-order index is determined based on a value of the coordinate-axis-order index corresponding to the processing order;
    encoding the coordinate-axis-order index and signalling encoded bits into a bitstream;
    processing the point cloud data according to the processing order, to obtain point cloud data to-be-encoded; and
    encoding the point cloud data to-be-encoded and signalling encoded bits into the bitstream.

2. The method of claim 1, wherein determining the processing order of the point cloud data during point cloud encoding comprises:
    determining the processing order according to a Morton code of a node in the point cloud data.

3. The method of claim 1, wherein the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

4. The method of claim 3, wherein determining the coordinate-axis-order index corresponding to the processing order comprises:

setting the value of the coordinate-axis-order index corresponding to the processing order according to a correspondence table between preset indexes and processing orders.

5. The method of claim 4, wherein the correspondence table between the preset indexes and the processing orders comprises:

| coordinate-axis-order index | processing order |
| --- | --- |
| 0 | Z-Y-X order |
| 1 | X-Y-Z order |
| 2 | X-Z-Y order |
| 3 | Y-Z-X order |
| 4 | Z-Y-X order |
| 5 | Z-X-Y order |
| 6 | Y-X-Z order |
| 7 | X-Y-Z order. |

6. A point cloud decoding method, implemented in a decoder and comprising:
parsing a bitstream to obtain a coordinate-axis-order index;
determining a processing order of point cloud data during point cloud decoding according to the coordinate-axis-order index, the processing order indicating a coordinate axis processing order of three-dimensional coordinates of the point cloud data and the point cloud data being all or part of data in point cloud, wherein the coordinate-axis-order index is determined based on a value of the coordinate-axis-order index corresponding to the processing order;
parsing the bitstream to obtain recovered data of the point cloud data; and
determining a position of coordinate data of the point cloud data in a storage unit of the recovered data according to the processing order.

7. The method of claim 6, wherein parsing the bitstream to obtain the coordinate-axis-order index comprises:
parsing a fixed length code to obtain the coordinate-axis-order index; or
parsing a bitstream corresponding to a data unit of a parameter set in the bitstream, wherein the data unit of the parameter set contains parameters used for decoding the point cloud data.

8. The method of claim 6, wherein the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

9. The method of claim 8, wherein determining the processing order of the point cloud data during point cloud decoding according to the coordinate-axis-order index comprises:
determining the processing order corresponding to the coordinate-axis-order index according to a correspondence table between preset indexes and processing orders.

10. The method of claim 9, wherein the correspondence table between the preset indexes and the processing orders comprises:

| coordinate-axis-order index | processing order |
| --- | --- |
| 0 | Z-Y-X order |
| 1 | X-Y-Z order |
| 2 | X-Z-Y order |
| 3 | Y-Z-X order |
| 4 | Z-Y-X order |
| 5 | Z-X-Y order |
| 6 | Y-X-Z order |
| 7 | X-Y-Z order. |

11. An encoder, comprising:
at least one processor; and
a memory coupled to the at least one processor and storing at least one computer executable instruction thereon which, when executed by the at least one processor, causes the at least one processor to:
determine a processing order of point cloud data during point cloud encoding, the processing order indicating a coordinate axis processing order of three-dimensional coordinates of the point cloud data and the point cloud data being all or part of data in point cloud;
determine a coordinate-axis-order index corresponding to the processing order, wherein the coordinate-axis-order index is determined based on a value of the coordinate-axis-order index corresponding to the processing order;
encode the coordinate-axis-order index and signal encoded bits into a bitstream;
process the point cloud data according to the processing order, to obtain point cloud data to-be-encoded; and
encode the point cloud data to-be-encoded and signal encoded bits into the bitstream.

12. The encoder of claim 11, wherein the at least one processor configured to determine the processing order of the point cloud data during point cloud encoding is configured to:
determine the processing order according to a Morton code of a node in the point cloud data.

13. The encoder of claim 11, wherein the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

14. The encoder of claim 13, wherein the at least one processor configured to determine the coordinate-axis-order index corresponding to the processing order is configured to:
set the value of the coordinate-axis-order index corresponding to the processing order according to a correspondence table between preset indexes and processing orders.

15. The encoder of claim 14, wherein the correspondence table between the preset indexes and the processing orders comprises:

| coordinate-axis-order index | processing order |
| --- | --- |
| 0 | Z-Y-X order |
| 1 | X-Y-Z order |
| 2 | X-Z-Y order |
| 3 | Y-Z-X order |
| 4 | Z-Y-X order |
| 5 | Z-X-Y order |
| 6 | Y-X-Z order |
| 7 | X-Y-Z order. |

16. A decoder, comprising:
at least one processor; and
a memory coupled to the at least one processor and storing at least one computer executable instruction thereon which, when executed by the at least one processor, causes the at least one processor to:
parse a bitstream to obtain a coordinate-axis-order index;
determine a processing order of point cloud data during point cloud decoding according to the coordinate-axis-order index, the processing order indicating a coordinate axis processing order of three-dimensional coordinates of the point cloud data and the point cloud data being all or part of data in point cloud, wherein the coordinate-axis-order index is determined based on a value of the coordinate-axis-order index corresponding to the processing order;
parse the bitstream to obtain recovered data of the point cloud data; and
determine a position of coordinate data of the point cloud data in a storage unit of the recovered data according to the processing order.

17. The decoder of claim 16, wherein the at least one processor configured to parse the bitstream to obtain the coordinate-axis-order index is configured to:
parse a fixed length code to obtain the coordinate-axis-order index; or
parse a bitstream corresponding to a data unit of a parameter set in the bitstream, wherein the data unit of the parameter set contains parameters used for decoding the point cloud data.

18. The decoder of claim 16, wherein the processing order is any of a Z-Y-X order, an X-Y-Z order, an X-Z-Y order, a Y-Z-X order, a Z-X-Y order, and a Y-X-Z order, and X, Y, Z are coordinate axes of the three-dimensional coordinates of the point cloud data.

19. The decoder of claim 18, wherein the at least one processor configured to determine the processing order of the point cloud data during point cloud decoding according to the coordinate-axis-order index is configured to:
determine the processing order corresponding to the coordinate-axis-order index according to a correspondence table between preset indexes and processing orders.

20. The decoder of claim 19, wherein the correspondence table between the preset indexes and the processing orders comprises:

| coordinate-axis-order index | processing order |
| --- | --- |
| 0 | Z-Y-X order |
| 1 | X-Y-Z order |
| 2 | X-Z-Y order |
| 3 | Y-Z-X order |
| 4 | Z-Y-X order |
| 5 | Z-X-Y order |
| 6 | Y-X-Z order |
| 7 | X-Y-Z order. |

* * * * *